United States Patent
Amin et al.

(10) Patent No.: US 6,910,074 B1
(45) Date of Patent: *Jun. 21, 2005

(54) SYSTEM AND METHOD FOR SERVICE SESSION MANAGEMENT IN AN IP CENTRIC DISTRIBUTED NETWORK

(75) Inventors: Rajesh B. Amin, Desoto, TX (US); Donald V. Hanley, McKinney, TX (US); John Allahyari, Dallas, TX (US); Mike Hall, Carrollton, TX (US)

(73) Assignee: Nortel Networks Limited, Montreal (CA)

( * ) Notice: Subject to any disclaimer, the term of this patent is extended or adjusted under 35 U.S.C. 154(b) by 758 days.

This patent is subject to a terminal disclaimer.

(21) Appl. No.: 09/624,066

(22) Filed: Jul. 24, 2000

(51) Int. Cl.[7] .............................................. G06F 15/16
(52) U.S. Cl. ...................................... 709/227; 709/228
(58) Field of Search ................................. 709/249, 250, 709/223, 224, 227, 228, 330, 245, 218, 200, 201, 202; 370/389, 469, 356, 338; 395/684; 379/58

(56) References Cited

U.S. PATENT DOCUMENTS

| | | | | |
|---|---|---|---|---|
| 5,606,595 A | * | 2/1997 | Ejzak | 370/349 |
| 5,761,507 A | * | 6/1998 | Govett | 709/101 |
| 6,084,879 A | * | 7/2000 | Berl et al. | 370/389 |
| 6,125,388 A | * | 9/2000 | Reisman | 709/218 |
| 6,272,129 B1 | * | 8/2001 | Dynarski et al. | 370/356 |
| 6,363,411 B1 | * | 3/2002 | Dugan et al. | 709/202 |
| 6,452,915 B1 | * | 9/2002 | Jorgensen | 370/338 |
| 6,546,425 B1 | * | 4/2003 | Hanson et al. | 709/227 |
| 6,714,987 B1 | * | 3/2004 | Amin et al. | 709/249 |

OTHER PUBLICATIONS

Perkins, C., "IP Mobility Support", RFC 2002, Oct., 1996, PP 1–74.*

* cited by examiner

*Primary Examiner*—Marc D. Thompson
(74) *Attorney, Agent, or Firm*—Haynes and Boone, LLP

(57) ABSTRACT

Provided are a system and method for service session management in an IP centric network. In one example, the method includes accessing a network to establish a point of presence through an access interface layer at an access management layer and a core portion of the network and designating a default amount of bandwidth and a plurality of default setup parameters. Service is invoked through an allied application server on the network to establish an amount of network resources requested by a user. The allied application server manages any changes requested by the user to the quality of service parameters and bandwidth amount through the core network. A transport session is established to create and manage a connection from the user to a destination address.

72 Claims, 11 Drawing Sheets

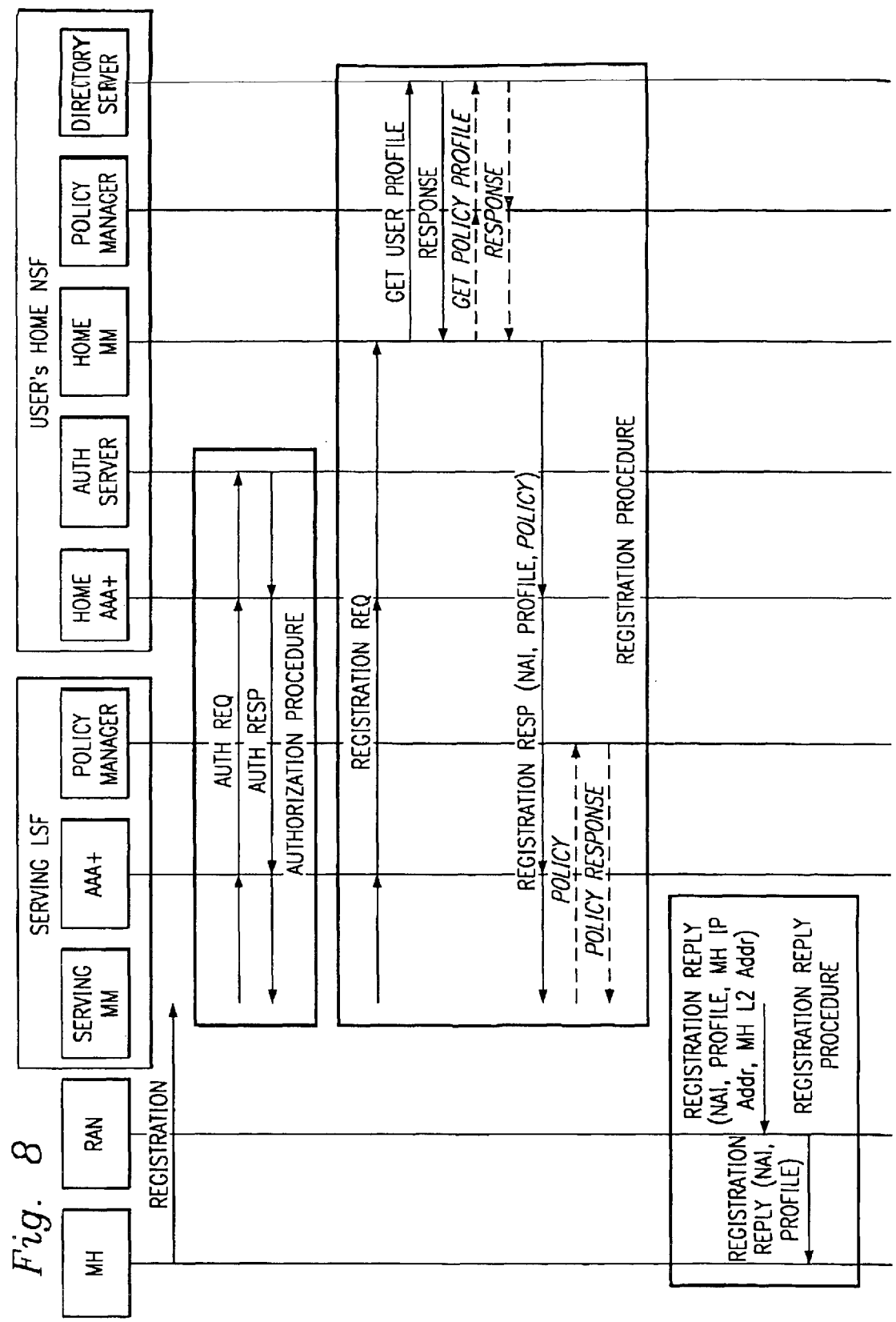

SYSTEM AND METHOD FOR SERVICE SESSION MANAGEMENT IN AN IP CENTRIC DISTRIBUTED NETWORK

CROSS REFERENCE

Incorporated by reference, the present invention is related to U.S. Pat. No. 6,714,987 filed Nov. 5, 1999, entitled "An Architecture for an IP Centric Distributed Network."

FIELD OF THE INVENTION

The invention relates generally to computers and, more particularly, to architecture for an Internet Protocol centric distributed network that supports data and telecommunication services and a method and apparatus for such a network.

BACKGROUND OF THE INVENTION

Recently, wireless communication devices have become more and more popular as a method of communicating from one point to another. Cellular Radio is one, and probably the most popular, method of wireless communication. The wireless communication uses different air technology to convey content or application information to the wireless communication devices. The network service providers may use different air technology regionally. The earlier systems as a whole have been focused on providing services to the end users within the limitations of the air technology used. Also, services are tightly coupled with the access network service providers.

However, recently, the need has arisen for a network designed that is agnostic to the air technology used. The service providers desire to offer identical services to the end devices regardless of the air technology utilized. In addition to the air technology agnostic need, network service providers wish to support multiple access technologies such as wireless, wireline, LAN networks etc. Also, the end user wishes to receive services from their choice of network service providers. Moreover, the access network service provider wishes to get a chance to offer value-added services to their own and visiting end-users. Thus, a definite need of service architecture has arisen for an access network service provider to support multiple application service platforms that can form alliance with and/or operate independently from the access network service provider.

SUMMARY OF THE INVENTION

In contrast to the prior art, the present invention is based on the patent "An architecture for an IP centric distributed network", incorporated by reference above. This patent describes the next generation network (NGN) architecture centered on IP mobility management, call/session management, and network management services. The call/session management task introduced the concept of separation for access session, service session, and transport session management tasks.

The present invention elaborates on the call/session management task. It describes the role of service session management functions in an IP-based NGN architecture. The service session management role of the NGN architecture facilitates network services to the application service platforms and/or to the end users based on subscribers' specific information and network preferences. Such information is valuable to the application service platforms to provide value-added services to the end users. Such information may include users' static and dynamic need based on users' current location, users' habits, devices used by user, desired quality of service, and users' preferences. Also, such information may include network preferences related to a service, and based on business and network management policies.

The NGN architecture uses an open interface to the application service platforms and/or to the end users where possible for the appropriate network services. Some such network services include providing a policy management role related to subscriber and network resources, AAA+ functions, dynamic changes in quality of service, etc.

The session management task is one of the three main tasks that take place in an IP centric Next Generation Network (NGN) to support transaction and non-transaction-based applications or services. The essential areas of the NGN architecture consist of IP mobility management, session management, network management and gateway devices. The gateway devices interface with other systems supporting different protocols. The session management task includes three main activities: an access session management, the service session management, and the transport session management. The focus of this invention is for the service session management. The service session management utilizes application-based protocols and leverages on the current IETF standards development.

The concept and model presented for the service session management in the NGN architecture provides several advantages. The NGN architecture components remain loosely coupled with other application service provider platforms. This allows a network service provider to form an alliance with multiple application service providers and extends unlimited applications or services to the end users. Also, end users get a flexibility to use any access network service providers, any third party application service provider or the user's home network services.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 8 is a diagram of the Registration—Policy Rules Instantiation at LSF;

DETAILED DESCRIPTION OF THE PREFERRED EMBODIMENTS

Figure 1:
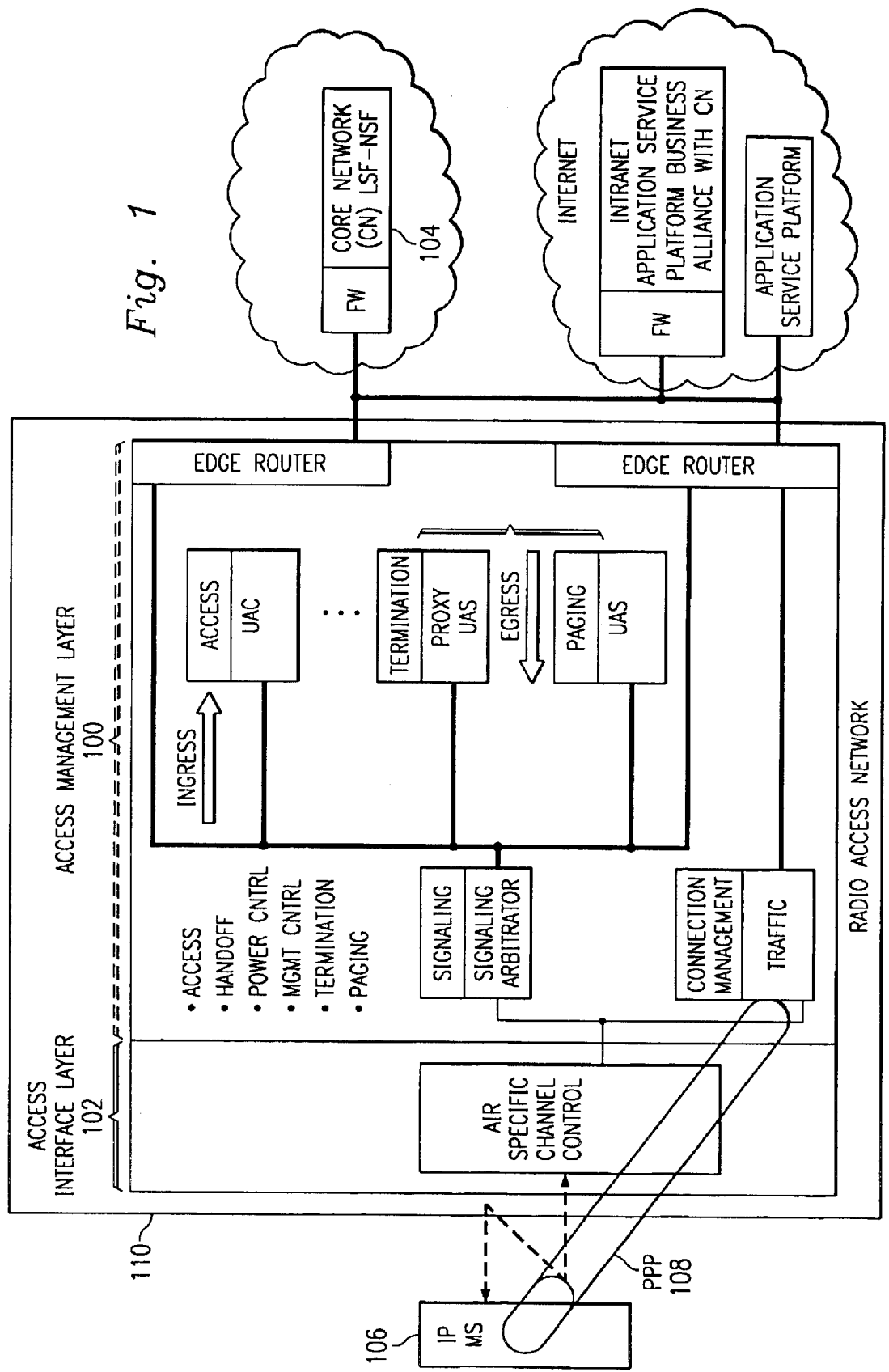
FIG. 1 is an abstract diagram of a network view.

The present invention can be described with several examples illustrated in the figures and scenarios provided throughout this document. It is understood, however, that the examples are not necessarily limitations to the present invention, but are used to describe typical embodiments of operation. Additionally, a list of abbreviations and glossary will be listed first to facilitate a better understanding of the invention.

Abbreviations
AAA Authorization Authentication Accounting
AAA+ Authentication, Authorization, and Accounting extension
AML Access Management Layer
ATM Asynchronous Transfer Mode
CDMA Code Division Multiplex Access
COPS Common Open policy Service
dB data Base
DEN Directory Enabled Networking
DHCP Dynamic Host Configuration Protocol
DNS Directory Name System
DS Directory Server
FR Frame Relay
HDLC High Level Data Link Control
IP Internet Protocol
ITU International Telecommunication Union
LAN Local Area Network
LDAP Lightweight Directory Access Protocol
LDP Local Decision Point
LSF Local Serving Function
MH Mobile Host
MM Mobility Manager
MPLS Multi-Protocol Label Switching
MS Mobile Station
NGN Next Generation Network
NGWN Next Generation Wireless Network
NSF Network Serving Function
PDP Policy Decision Point
PPP Point to Point Protocol
PSTN Public Switched Telephone Network
QoS Quality of Service
QoS Quality of Service
RAN Radio Access Network
RSVP Resource ReserVation Protocol
RTCP Real Time Control Protocol
RTP Real Time Protocol
SDP Session Description Protocol
SIP Session Initiation Protocol
SM Session Management (role or function)
SMS Short Message Service
SSM Service Session Management
TCP Transmission Control Protocol
UAC User Agent Client
UAS User Agent Server
UD Unified Directory
UDP User Datagram Protocol
UMTS Universal Mobile Telecommunication System
UN Unified Network
WAG Wireless Access Gateway
xAN Any Access Network Definition of terms 2G: The current wireless network components are referred to as the second generation components. The 2G-network component uses industry-defined protocols and interfaces to communicate between the system and network components.

3G: The future wireless network components evolved from the 2G components are referred to as the third generation components. In this document it is assumed that the 3G will be backward compatible to the 2G. For example, 3G mobile (voice mode) terminal is capable to act as 2G mobile (voice mode) in voice call support. In addition, 3G will be able to support new standards for making a multi-media call using newly defined standards. The gateway devices may be used to support 2G and 3G components.

DS: The Directory Server provide interfaces to the Unified Directory (databases). The Directory Server services give structure to complex and heterogeneous networks by enabling the tools that provide access to, and management of networks. The client of the directory server access the information contained in these databases via a standard access protocol such as DAP or LDAP. The database schema, the type of database and storage techniques is transparent to the clients. The directory server receives the queries from the clients and retrieves the information from the databases. The interface between the directory server and the databases may be proprietary or standard based. The directory server formats the information retrieved from the database and sends it back to the client in the appropriate response message.

LSF: The LSF is the serving area network for sets of access networks. It is owned by the operator and separated by the geographical parameters. It consists of several system components. Some of these components are call servers, mobility manager, directory server, DHCP, DNS, Gateway devices, etc. The Local Serving function (LSF) is the serving component of the UN that provides services to local and visiting subscriber (users) in that area.

NG: The future wireless network components that evolve from the 3G components are referred to as the Next Generation components. The NG components are assumed to take full advantage of the IP centric network infrastructure and eliminate the need of gateway devices. End devices will become smarter with the capability of communicating without the need for the gateway or mapping functions.

NGN: The Next Generation Network is the IP centric core-network consisting of LSF and NSF network components. The NGN is assumed to be independent of air interface technology. The interfaces between system components of the NGN are based on the LAN/WAN technology and uses a client server architecture. The unified network and the next generation network terms provide the same meaning and are used interchangeably in the text.

NSF: The Network Serving function is the home network that owns the subscription associated with the end user. It is a user subscription "defined" entity of the UWN architecture. It consists of several system components. These components may include legacy components through the necessary interfaces or their functional equivalent suitable to the IP centric environment. Some of these components are HLR, SCP, Unified Directory, AAA server, SN, IP Application Service Platform (provides value added applications to the client), etc. The Network Serving Function (NSF) is the global home component of the UN that owns the end user's subscription.

RAN: The Radio Access Network is the system component of the wireless network that provides radio control functions used in transmitting and receiving control and data information between mobiles and core network. The RAN itself is air technology dependent. However, it is evolving to provide independent functionality towards the IP centric core network. On this basis, RAN is assumed to have distinct radio interface and radio management components. Thus, radio management components provides the radio independent functionality towards the IP centric core network. Radio Access Network. RAN is used as an example where appropriate. However, xAN is the correct terminology represents any access technology.

UAC proxy: User Agent Client Proxy takes responsibilities on behalf of the UACs to send appropriate requests to the server.

UAC: User Agent Client is the first entity within the wireless network that assumes responsibility on behalf of the user to communicate with the core network or external network components. The UAC facilitates the activities in the ingress direction. Typically, the UAC is capable of communicating to the external servers directly. However, in some instances the UAC may convey such need to the UAC proxy.

UAS proxy: User Agent Server proxy is the first entity within the wireless network that assumes the terminating responsibility on behalf of the receiving user. However, it has the ability to forward or redirect the call/session to other external components. The UAS-proxy facilitates the activities in the egress direction. Typically, the UAS proxy is capable of communicating to the terminating user directly. However, in most instances the UAS-proxy just conveys such information to the UAS that in turn communicates to the end user.

UAS: User Agent Server is the entity that receives requests from the UAC or the UAC proxy. It facilitates the activity in the egress direction.

UD: A Unified Directory is a database in which various types of information associated with network is stored. This information includes the objects in the network infrastructure that consists of user profile, server locations, applications, hubs, routers, policy rules, service level agreements, etc. For an example, directories that are commonly used are based on X.500, which is an ITU standard for directories in the telecom space.

UN: The Unified Networks is the IP centric core-network consisting of LSF and NSF network components. The UWN is assumed to be independent of air interface technology. The interfaces between system components of the UWN are based on the LAN/WAN technology and use client server architecture. The unified network and the next generation network (NGN) terms provide the same meaning and are used interchangeably.

WAG: The Wireless Access Gateway is the collection of entities that interface with the wireless access network such as NGN RAN and provides controlling capabilities to facilitate the RAN resources to meet users' requirements such as bandwidth management, QoS and also to interface with the intranet or Internet components.

WGW: The Wireless GateWay is the entity that interfaces and provides gateway functionality between the traditional wireless access such as BSC and the IP centric network. The WGW is assumed to provide merely tunneling capabilities to transport messages such as DTAP or BSMAP between IP centric network and the traditional 2G-access controller. This definition is not used in this document. However, it is provided just to differentiate the meaning of WGW with the WAG described earlier.

xAN: The core network is an access technology agnostic. Access Networks can be any type of access technology. Thus, xAN indicates the access network attached to the core network can be a wireless access supporting any air technology, wire-line access, LAN based network or any other kind of access network. For simplicity and ease of understanding, at various places in this document radio access network (RAN) is used for an example.

Other Used Terms:

Core Network: The core network indicates the network specific functional components that can provide the decision-making capabilities in order to provide services to the end users, application service platforms, and to other networks. The core network can be hierarchically divided into sub layers as needed based on the network scope and coverage. Commonly the core network is divided into two service layers; a local service layer and network service layer. The core network is access agnostic.

Egress: This term is used for those activities that occur in direction from the network to the mobile host.

Incoming call/session: This term is used as defined by the Bellcore documents. This term is used for the call/session activity that originates from the external network and progresses to the mobile host through the serving network.

Ingress: This term is used for those activities that occur in direction from the mobile host to the network.

Local service layer: The local service layer is part of the core network. It externally interfaces towards an access network and the service application servers. It facilitates the ingress and egress activities relevant to the end users. Also, internally it interfaces with the network service layer that provides global network functions.

Network service layer: The network service layer is part of the core network. It externally interfaces towards other global networks, and application servers. It facilitates the information bridging between different networks. Also, internally it interfaces with the local service layer to exchange relevant information.

Network services: The network services are the services those are provided by the core network components. The core network components are hierarchically distributed in local service layer and network service layer. The network service functions are the functions provided by the network service layer functional components. And, the local service functions are the functions provided by the local service layer functional components. In addition to the following identified functions, please refer to the Appendix B: Core network functions described in patent "An architecture for an IP centric distributed network", that was filed on Nov. 5, 1999. The network services provided by the local service functions include the following:

It is the serving area network for sets of access network.

It can support multiple xANs where each xAN is associated with a different technology, e.g. one xAN is a North American CDMA wireless access network, another is GSM wireless access network, another is an Ethernet enterprise network.

Forwards the data sent by the end user.

Provides mobility management for user mobility across the access networks that it serves.

Provides accounting functions.

Provides authentication and authorization functions.

Route data to the end user via the IP address that the end user currently using.

Supports access to multiple NSFs from the same device.

The network services provided by the network service functions include the following:

- It is the home network and "owns" the end user's subscription and associated profile.
- Supports a "Unified Directory" for subscriber profiles and policies independent of the access type.
- Provide mobility to subscribers on a larger scale. The end user can roam in any LSF and handling of this mobility is done in the NSF. The mobility management entity in the NSF is responsible for maintaining the current location of the user.
- Provides routing information to anyone requesting to establish communications with the end user.
- May provide the authentication and authorization functions for the end users those consider it as their home.
- Provides accounting functions.

Outgoing call/session: This term is used as defined by the Bellcore documents. This term is used for the call/session activities that originated from the mobile host and progresses to other network through the serving network.

Service Session Related Objectives

The service session management function enables application service platforms or direct request from an end user to use access network service provider's network resources and network services. More precisely, the service session management function coordinates to validate and enforce demands for change in resources or quality of service based on the access network service provider's policy rules. Such rules are set with respect to the service, business and network management requirements of the network service provider. Also, it includes rules based on service level agreement derived with different network service providers and application service platforms that allow them to use network resources and network services.

The end users are served by application service platforms. Thus, those application service platforms are in alliance with the access network service provider that can use the serving network services to dynamically change network resources. That will allow an end user to access globally available network services at needed bandwidth at a desired quality of service. The following paragraphs describe a few identified objectives.

To identify access network service provider's services to facilitate use of access network's services and resources to provide services independent from the end user's (subscriber's) home network.

To identify an interaction involved in providing core network services that are based on service level agreements with other networks (application service platforms, home network of an end user or third party).

To identify access service provider's role in enabling end user to form a private network within the scope of the serving network.

To identify a scheme for reporting network resource usage (accounting).

To establish and manage voice, paging, SMS, and circuit and packet data oriented services (e.g. multi-media conference, on-line subscription, etc.).

To provide service capabilities related to information and functionality of the access network service provider such as dynamic negotiation of QoS, use of Intranet service application servers, network services and use of access and communication resources.

To achieve distributed transparencies for applications.

To achieve optimized information caching significant to established clusters and domains.

To reduce dependencies for availability and reliability of network components due to network problems, server problems and faulty software.

To identify both connection oriented and transaction-oriented services.

To identify inter-working relationships between non-IP access network and IP-based core network.

Service Session Management Task Description

"An architecture for an IP centric distributed network" incorporated by reference above, describes an architecture centered on IP mobility management, call/session management, and network management services. As described therein, the call/session management services consist of three functions. These functions are: 1) establishing an access session between the mobile host and the serving network; 2) an invocation of a service session by the end user; and 3) facilitating network resources to establish a point to point or a point to multi-point virtual connection. In addition, the system focuses on the functional distribution into logical service layers and functional components. In context with this architecture, the preferred embodiment also explores the role of the service session management functions.

The service session management task provides an important role during three session management services identified earlier. The service session management task is viewed as collection of distributed functions distributed in various functional components within the NGN architecture. The access network service provider's core network components and application service platforms are agnostic to the network resources for media transport and air resources used. However, an appropriate transport session with desired quality of service and bandwidth requirement needs to be established based on the service invoked by the end user. This requires provisioning of appropriate network infrastructure resources and air resources for desired bandwidth, data rate and selection of suitable data path that provides guarantee for delay and jitter requirement. Such provisioning is done based on the default parameters during access session establishment. Accounting instance is also instantiated for the period of access session establishment at the serving access network provider for the usage of the network resources. The application service platform serving end user may keep appropriate accounting parameters based on the predetermined method and reporting scheme to the accounting server of the serving access network provider. The accounting parameters may include time used, number of access, packets transferred (if separate media transport is provided by the application service platform), etc., Also, appropriate application service platforms are configured with end user and network preference related information or provided access to fetch relevant information from the access network service provider's resources. As a result, an end user gets flexibility of 'always on' and 'always available' services and resources during service invocation. Thus, the application service platform can provide services to the end users independently without intervention from the access network service provider. However, such service invocation capabilities are constrained by the default setting and provisioned resources.

An end user may request a change in resources. An end user may make such request explicitly or implicitly. In case of explicit request, an end user may send message to the access network if configured and capable to receive IP based messages. In case of an implicit request, an end user integrates the desired request for network resources within the service invocation request message. For an example in case of implicit request, an end user may send SIP messages with appropriate desired QoS using SIP and SDP protocol to the serving protocol server (an application server providing session control protocol services). The serving protocol server interfaces with the core network components of the access network service provider to facilitate the end user's need. Similarly, for an example in case of explicit request, an end user may send RSVP messages using the RSVP protocol to the access network at the access management layer (AML). The AML is described in the U.S. Pat. No 6,714,987. The AML interfaces with the core network component that provides policy decision, for an example using RSVP-COPS protocol to provide desired QoS and network resources to the end users.

The service session management task of the core network facilitates to grant such request by validating request with other appropriate core network components that performs authentication, authorization and accounting functions. Alternatively, the service session management task may interface with the policy management function to validate request and get directives to satisfy request. The service session management task performs the policy enforcement function based on the directives received from the policy management function. As a result of this task, the service session management task interfaces with the connection management entity at the access network at the access management layer to alter the default setting or to establish new setting for the transport session. This may include change in network resources and air resources. Similarly, the service session management task aids the application service platform by providing appropriate directives to extend and complete the service invocation task. Alternatively, the application service platform if in alliance with the access network provider, the access network provider may provide the appropriate access and permission for its resources to be modified or set as required by the application service provider.

Role of Service Session Management Functions

Some of the major session management functions include feature analysis, enforcement of network preferences and user capabilities, dynamic provisioning of QoS, dynamic provisioning of data rates, enforcing access restriction at the serving network, routing functions, connection types, handling of multi-media sessions, and accounting. The service session management functional role is collectively provided by core network functional components.

Additionally, these functions are coordinated and performed by the core network functional components, service application servers and access network functional components. In order to optimize performance, these functions are distributed in different service layers and information is cached to an appropriate local decision point. Such a local decision point in the hierarchy has the capability to provide decision enforcement.

Feature Analysis

The Feature Analysis that performs functions such as is the requested service compatible with current subscription, is the terminal capable of supporting requested service, etc. The application servers in association with the core network components that include AAA, policy manager, etc., mainly perform these functions.

Network Preferences and User Capabilities (First Portal Opportunity)

Configuration of terminal/network resources is based on Network preferences and user capabilities and provides the first portal opportunity to the local serving networks. Through a specific application server, the core network components, such as the mobility manager during registration time, or the authentication and/or authorization server during service invocation time, configures network resources and the end terminal and provides a first portal opportunity for the access network provider.

Dynamic Provisioning of QoS

Dynamic provisioning of QoS allows modifying the default setting to the requested setting. An implicit or explicit request comes from the end user to set or modify the existing QOS through the application server. The policy enforcement function of the core network or the authorization function, provisions the required network resources at the access network that modifies the transport session. Alternatively, the application server can be informed with the needed information and permission to modify the transport session at the access network.

Dynamic Provisioning of Data Rates

Dynamic provisioning of data rates allows modifying the default data rate setting to the desired data rate. An implicit or explicit request comes from the end user to set or modify the existing data rate through the application server. The policy enforcement function of the core network or the authorization function provisions the needed network resources at the access network and modifies the transport session. Alternatively, the application server can be informed with the required information and permission to modify the transport session at the access network.

Access Restriction at the Serving Network

Access is restricted at the serving network based on the subscription options & authorization, and any temporary limitations based on the network's current condition. The policy manager and the authentication, and/or authorization server provide this functionality during access session establishment and/or service session invocation.

Routing Function

The routing function provides the routing address of the final entity or an entity that can extend further routing. The DNS, DHCP, policy manager, and/or AAA functional components are also involved in order to complete the routing. Service capability can be obtained by end to end negotiation during session setup and can be stored dynamically at the serving network and can also be configured at the service application servers. Terminal capabilities can be obtained at service invocation and/or at the time of user registration. During service session invocation, the user provides the destination IP address of the packet handler.

In the home environment, this destination packet handler IP address may be a permanent IP address assigned to the mobile host. In a visitor environment, this destination packet handler IP address may be assigned to the mobile host by the serving network based on the domain scope or mobile host's permanent IP address negotiated during access session establishment.

Mobility Function

The mobility function provides the mobility functionality across the access networks and at-large scale between local serving networks. The mobility manager, AAA, DHCP, and the policy manager components of the core network facilitate the mobility function.

Connection Types

Connection types that manage point to point service include connectionless and connection-oriented services, and point to multi-point which include multicast services. The policy manager and the authorization server functional components of the core network facilitate this function in coordination with the access network components that include the resource manager and the connection manager.

Handling of Multi-Media Sessions

The ability to handle multi-media sessions provides bearers with flexible QoS and allows the user to modify QoS during an ongoing session as required by the user's applications. Additionally, the ability provides parallel sessions that allow transferring different media in different sessions and point to multi-point sessions. This can be used for multi-media distribution services.

The policy enforcement function of the core network or the authorization function facilitates provisioning required network resources at the access network to modify the transport session. Alternatively, the application server can be informed with the required information and permission to modify the transport session at the access network. Also, the policy manager and authorization server functional components of the core network facilitate this function in coordination with the access network components that include a resource manager and a connection manager.

Accounting

The accounting aspects enforce the accounting and billing policies for services, and collect and report the charging data to the operator's billing system. The accounting clients at the application servers facilitate the accounting activities at the service level for the end users. The accounting server and policy manager components of the core network in coordination with the accounting client at the access network, and the connection manager facilitate various accounting needs for tracking of the usage of the resources. The accounting server also interfaces with the storage disk to protect and store collected accounting data The billing server also interfaces with such devices to fetch collected data in order to create a customer billable record.

An NGN Architecture Emphasizing on Service Session Management

The context for the service session management activities will now be described. First, an abstract level network view is provided. Then, further decomposition is illustrated that distinguishes the application service platform and core network perspectives. Based on these decompositions, a logical interface model is depicted that summarizes interactions between network entities and the role of service session management activities. Independence from the session control protocol such as the session initiation protocol (SIP) and H.323 are also described.

Abstract Level Network View

The NGN-Wireless Internet is an example of an IP centric distributed LAN based architecture. The network components in this architecture are functionally separated as required to fulfill the need of wireless telecommunication and also suitable to integrate with other data and telecommunication networks.

Referring to FIG. 1 now, the IP capable radio access network consists of access management layer (AML) 100 and air interface layer (AIL) 102 management components. Access management components consist of connection management and other functional components that are capable to provide access specific functions. The connection management function facilitates to establish a transport session using appropriate network infrastructure such as ATM, Ethernet, FR, etc. Also, the connection management component provides the separation (independence) of the network infrastructure and resources used from the access and service session activities. Other functional components consist of access management (manages origination and termination), paging, power control, RF management, location tracking, and handoff functions to name few. These components collectively provide interface with the core network 104 components for the network services and air interface layer for air interface controls. An IP level addressing transparency for an air interface between the mobile host 106 and connection management component is established using PPP link 108 during an access session establishment.

Figure 2:
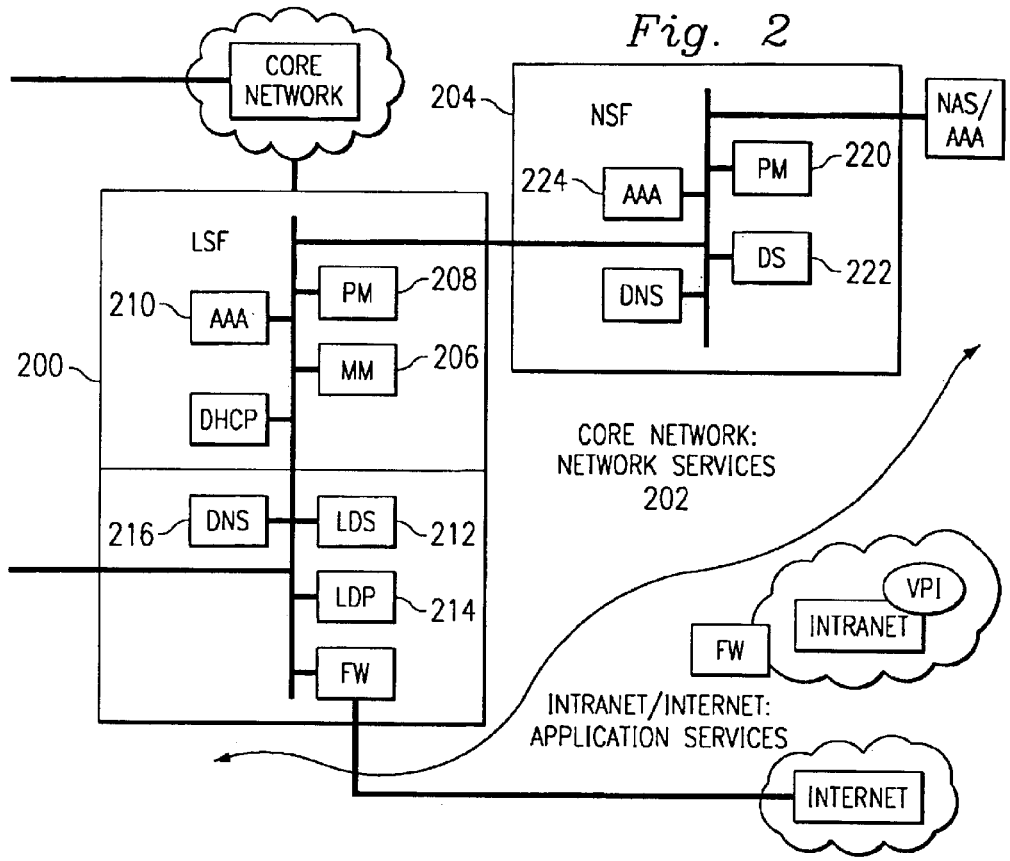
FIG. 2 is a diagram of the LSF and NSF of the Core Network
Figure 3:
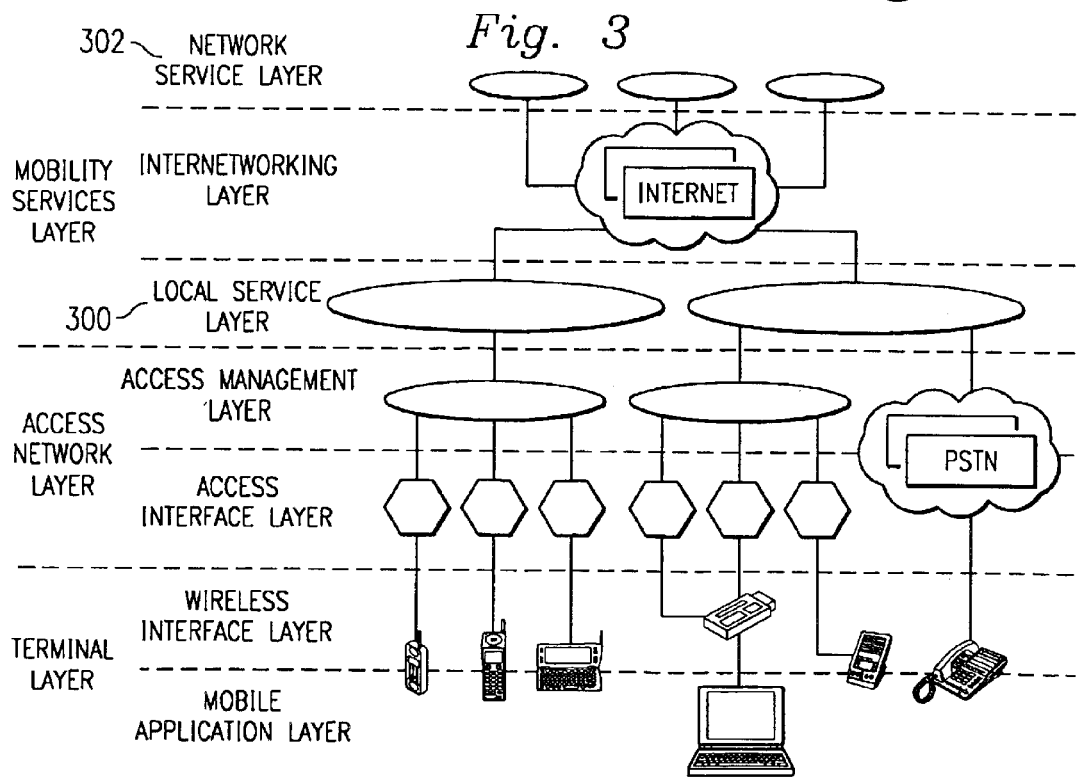
FIG. 3 is a High-level Network Architecture diagram.
Figure 4:
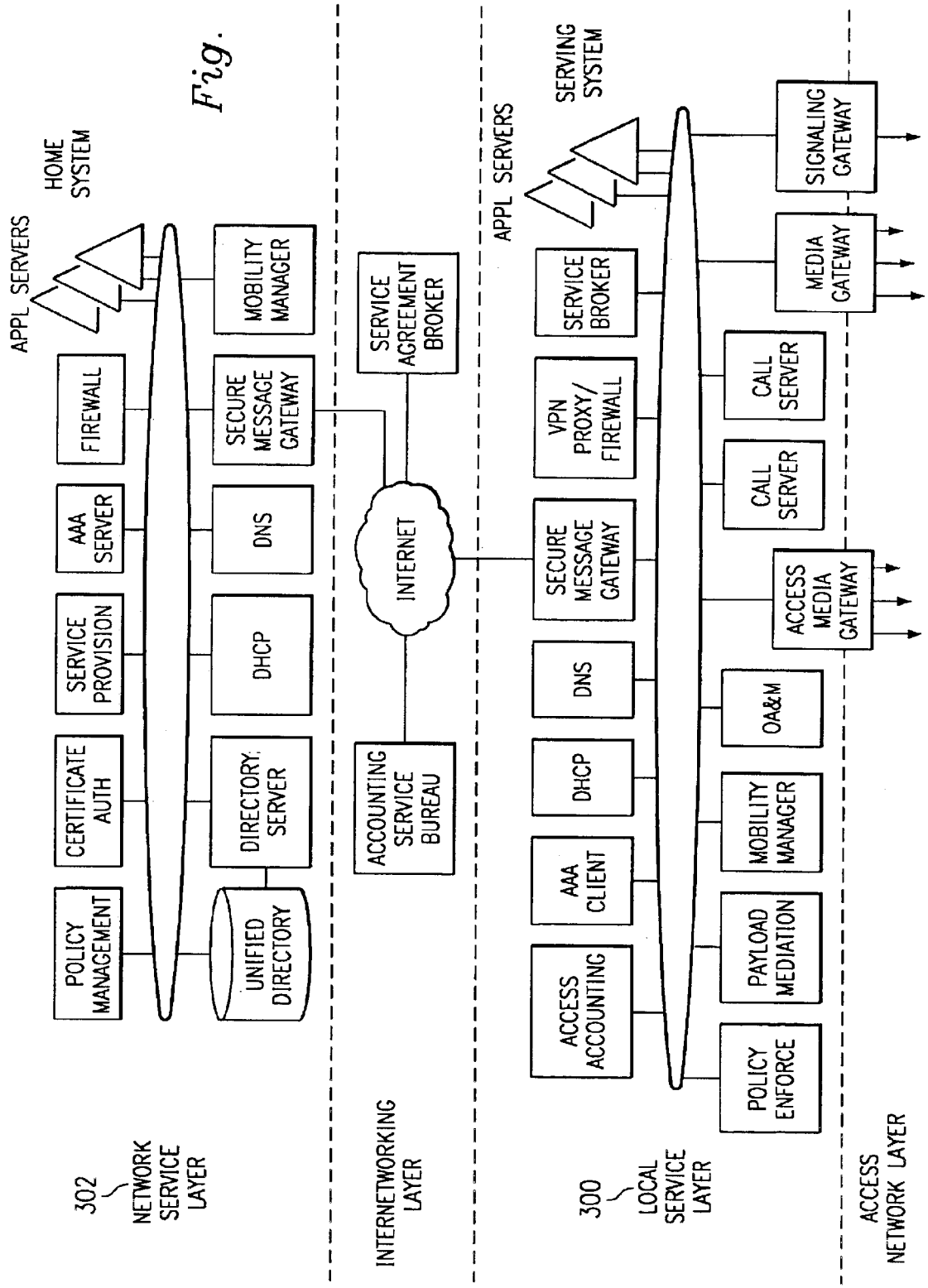
FIG. 4 is a Core Network Architecture diagram.
Figure 5:
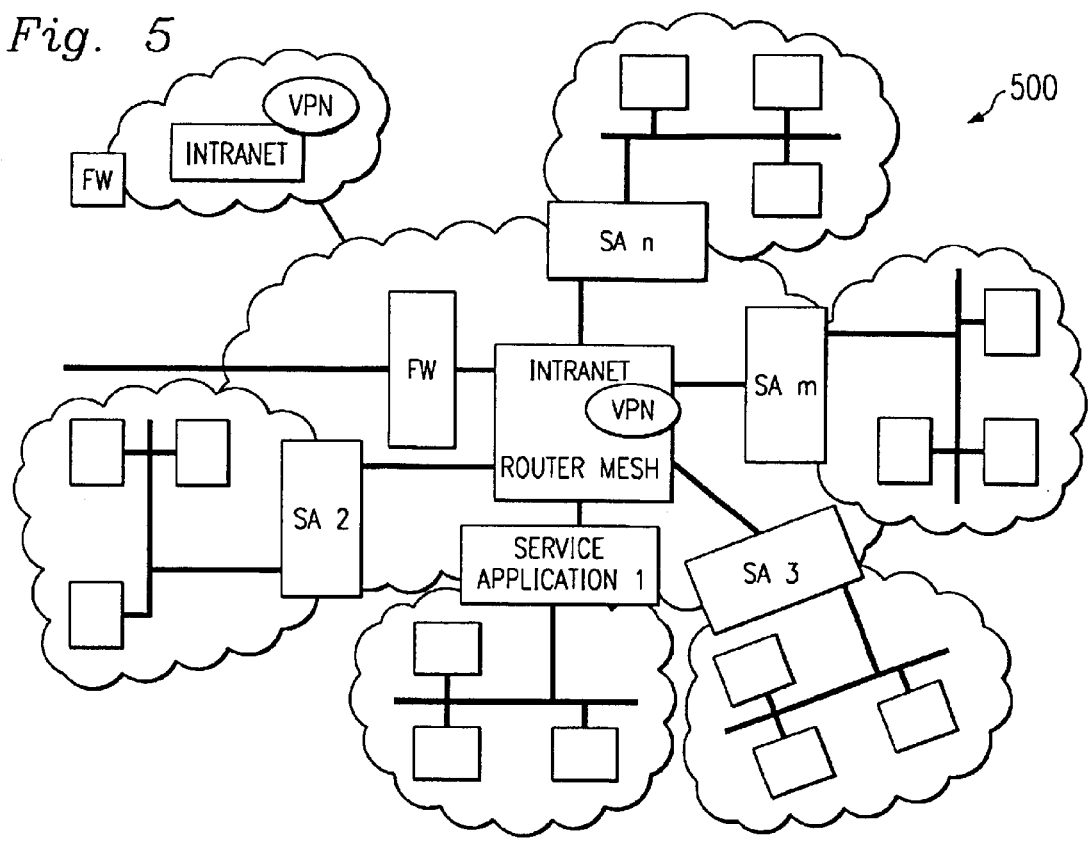
FIG. 5 is a diagram of network allied (Intranet) service application platforms.
Figure 6:
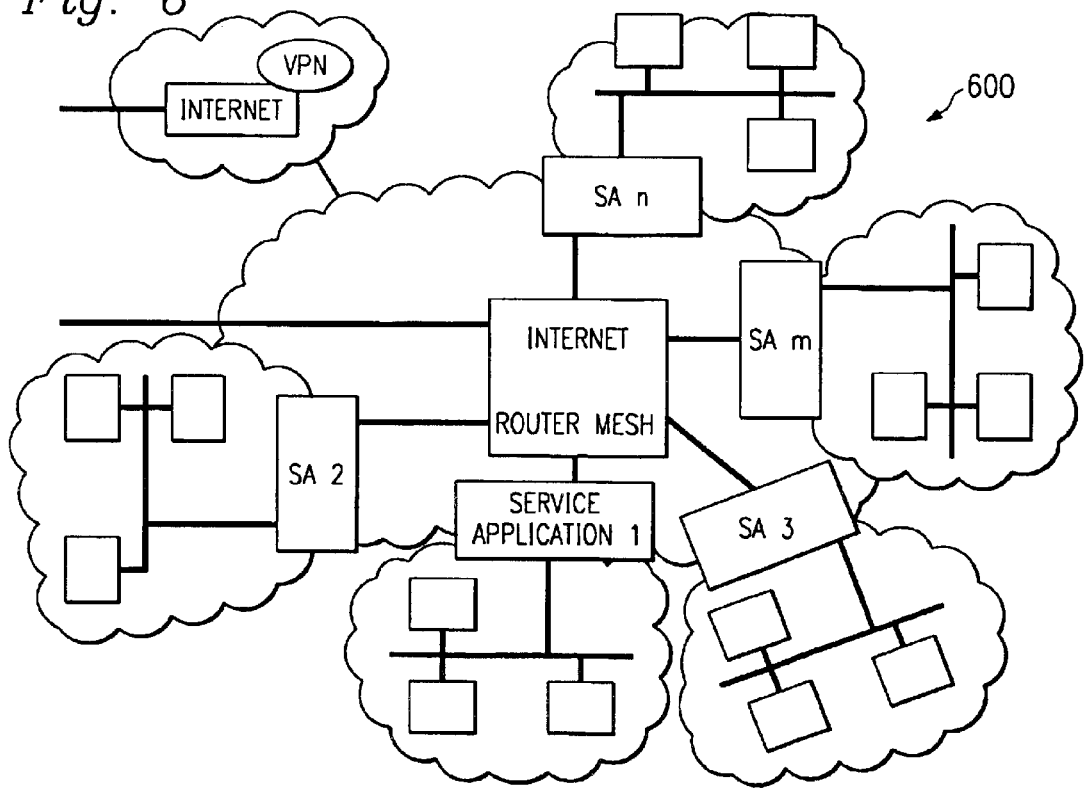
FIG. 6 is a diagram of network independent third party (Internet) service application platforms.

FIG. 1 also shows connectivity between the core network 104, the application service platforms in the AML 100 and access network 102. The figure and text refer a radio access network 110 as an example. The core network 104 is elaborated in FIG. 2 at an abstract level with few functional components. The detailed functional architecture is shown in FIGS. 3 and 4. The FIG. 5 illustrates application service platforms that are in a business alliance with the core network of the access network provider and form the secured Intranet. The FIG. 6 illustrates application service platforms that are not in business alliance with the core network of the access network provider and do not form secured relationship. The security association gets established between these entities, which are out of the scope of this description.

The core network components, particularly local serving functional 200 components interface with the service application platform. The multiple service application platforms can establish an alliance with the core network 202 using service level agreements forming a Virtual Private Intranet (VPI—consisting of allied service application servers) that provides value-added services to the end users.

The core network consists of hierarchically distributed LSF 200 and NSF 204 functional components that collectively provide session management, mobility management, and network management activities. To name a few, the local serving functional components include a mobility manager (MM) 206, a policy manager (PM) 208, AAA 210 functions, a local directory server (LDS) 212, a local decision point (LDP) 214, and domain name service (DNS) 216 functions. Similarly, a few of the network serving functional components include a policy manager 220, a directory server 222 that accesses an unified directory (database—not shown in figure), and AAA 224 functions. The service session management functional role is collectively provided by these functional components.

The high level network architecture illustrating distributed system layers and the core network architecture illustrating functional components (LSF and NSF) within the local service layer 300 and the network service layer 302 are shown in FIG. 3, while FIG. 4 shows more detail.

FIGS. 5 and 6 show service application servers in an Intranet 500; i.e. virtual private environment and service application (SA) servers in an Internet 600 environment respectively. The presence of a firewall at the core network and the Intranet network 500 indicate restricted access for the authorized users.

Logical Interface Model

Figure 7:
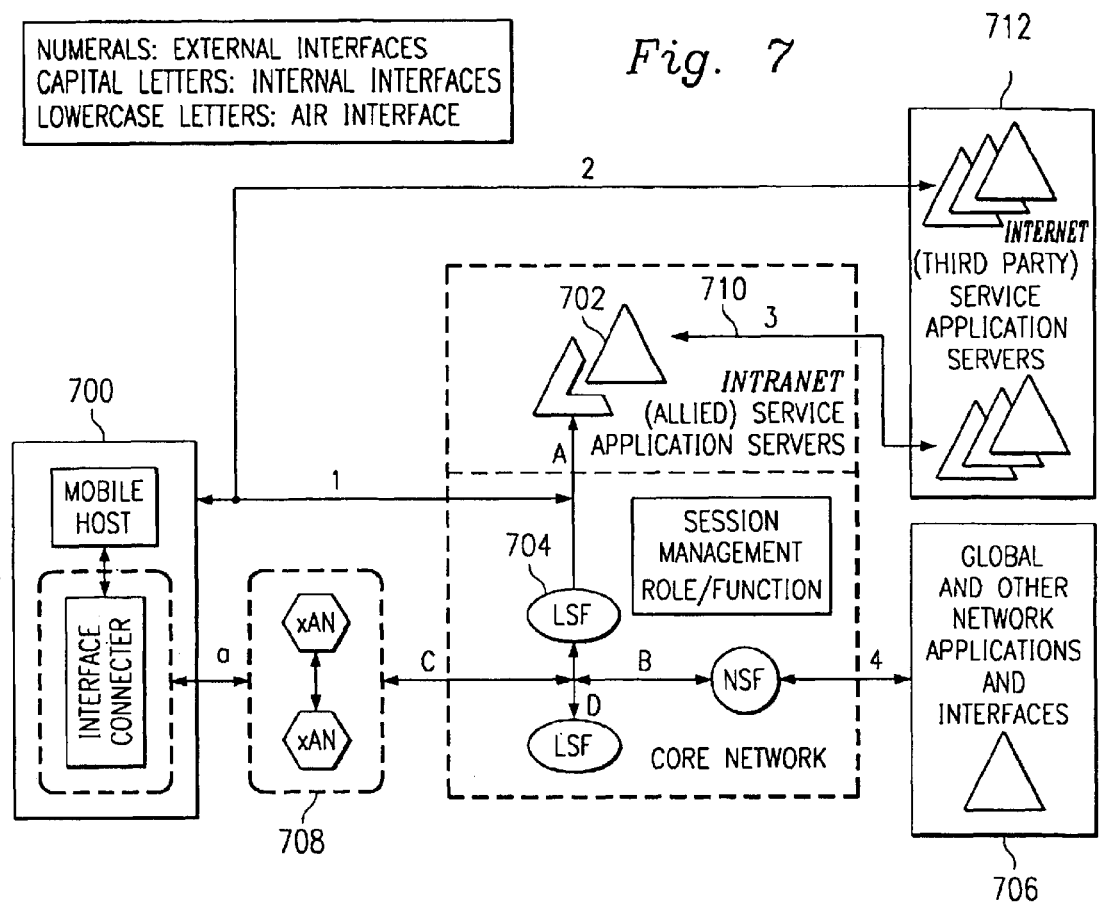
FIG. 7 is a diagram of the Logical Interface Model.

The logical interface model illustrates the primary control interfaces in the NGN architecture. The logical interfaces between communication system components are shown in FIG. 7. An end user 700 interfaces with a service application server 702 (service application server or protocol server serving end user is part of the service application platform) for the purpose of service session invocation or an origination. The service application server 702 facilitates the end users' request in extending a service request to an appropriate terminating device. An application server 702 using interface A, communicates with the LSF 704, core network components. The core network components provide the role of session management function and facilitate services such as policy decision and enforcement, dynamic change in network resources based on desired quality of service, bandwidth management, etc. To do so, the core network components interface with the global network, and specifically the network application servers 706 and with the xAN components 709 when necessary. For simplicity, based on the default users' and network parameters, some of the session management functions can be configured at the application server 706 and also to the xAN 708 to expedite the session establishment process.

The functional service components that provide the role of session management functions are distributed in appropriate network hierarchical service layers based on the functions performed. These service layers interact with each other to provide network services to the end users, service application servers, and other network domains. The service application servers can be part of the service provider's Intranet domain (allied) 710 or can be part of an independent Internet public domain 712. In the former case, the service application servers can take advantage of the network's knowledge about serving network, users, and users' profile information, in order to provide intelligent services to the end user. In the latter case, the service application servers do not have the privilege to use this information except through a service level agreement.

There are three basic session management tasks that include access establishment task, service-session invocation task and last that establishes transport connectivity. Please refer to the incorporated by reference patent entitled "An architecture for an IP centric distributed network" for detailed information on an access session establishment task that takes place during the mobile host network attachment or power-up registration.

During access session establishment, the end user's terminal 700 gets registered with the network and becomes attached to the (radio) access network. Subsequently, the end user 700 can send application level registration to the appropriate registrars of choice. It is also assumed that the mobile host is made aware of its default capabilities and available terminal and user applications by means of provided network preferences during the access establishment procedure. This download of user capabilities can be provided by the service provider's portal (possibly through the application server that is in alliance with the access network provider) and can be customized based on user needs. This implies that the download of these capabilities involves being aware of the device type and customizing the download based on this factor.

As an example in case of SIP protocol support, the mobile host will be made aware of the IP address of the SIP proxy server (an example of a service application server) if the user has subscribed to this service. Thus, as shown in the logical interface model figure, the mobile host directs an invocation request to the SIP proxy-server using interface # 1, which is one of many terminal/user applications the network can facilitate. Likewise, the service application server can be an H.323 gatekeeper device or a WAP server. Such service application servers are an integral part of the service provider's functional components or pool of services provided by the access network provider. These service components are assumed to be distributed, but can be combined together in order to achieve scalability and desired implementation options.

Internally, the service application servers interface with LSF functional components that provide service session management functions. Some of such services include name to address translation, authentication, authorization, accounting, policy decision/enforcement, etc. Interface A is used to achieve this capability. If desired, this functionality can be integrated with the services offered in a specific service application server.

It is important to understand that the service application servers are loosely coupled with the network and may be provided by any third party vendors. The service application servers may use their own network resources. If at any point the third party vendor servers require the ability to dynamically change the access resources within the xAN 708 (e.g. RAN), the request must be controlled from within the core network and an appropriate API must be developed between $3^{rd}$ party application server and the core components. This would be a proprietary API between the $3^{rd}$ party application server and an LSF component. Or an alternatively, $3^{rd}$ party application server interface with the pre-determined application server (using Interface # 3) that is in alliance with the access network provider through which desired service session management capabilities can be obtained.

Interface # 2 represents the same concept as an interface # 1 except that the service application servers are part of the public Internet domain and lack user and network information specifically available within the core network. These application servers provide service applications to the end user transparently from the access network provider and rely on the information exchanged between end user and the publicly available application service provider.

Interface # 3 represents the relationship between access network provider's service application servers and the publicly available service applications on the Internet. In this case, the publicly available services complement the Intranet service application offering to fulfill the service requirements of the end user (i.e. internal application servers are proxies).

Interface B represents the relationship between the local serving function and the network serving functions. With respect to service session management, the network serving function provides a global view of policy management, determination of user's current location, and centralized accounting.

Interface # 4 represents the relationship between different networks or service providers. Through this interface, user and terminal service capabilities are transferred to provide a virtual home environment to the roamer. Also, hierarchical global databases or global service offering capabilities can be accessed.

Interface C represents the relationship between the local serving function and the access technology dependent layer (xAN—e.g. RAN). Based on the policy decision made at the LSF during access establishment, service session invocation, and appropriate directives to setup air resources or transport infrastructure are performed through this interface. Accounting for resources used during such sessions are also performed through this interface.

Interface a is the access interface. The service session management tasks are independent of the access interface used. Examples of interfaces are IS-95, IS-136, WCDMA, other wireline interfaces, Ethernet, Layer 2 and Layer 3 interfaces, etc.

Interface D represents the relationship between two different serving domains and is used by the mobility management components.

Session Protocol Alternatives

The suitable call/session establishment control protocol choices for the NGN architecture are application layer based protocols. The NGN architecture leverages on the publicly available protocols rather than limiting to the proprietary protocols. Currently, two suitable protocols of choice are available. SIP protocol is standardized within an IETF standard body. The H.323 protocol (H.225 for signaling and H.245 for media control) is standardized within an ITU-T standard body. However, the NGN architecture is not limited to using only these protocols. Any application layer protocols developed in future can easily interface with the NGN architecture components using publicly available standard protocol.

The NGN architecture provides the service session management role-function to the application servers. The application servers can be allied with the access network service provider or can be independent from it. In the former case, application server can take advantage of the network services. The network services provided by the NGN architecture excludes call/session control services such as individual call/session admission control, call/session extension, etc. The application servers assume such responsibilities. However, the application servers can interface with the core components on need basis to get service session management functionality.

The NGN architecture views such application servers as specific application servers that provide specific protocol services. As discussed in scenarios through out this document as application servers that provides specific service (protocol) represents an example of an application service platform. For an example, in case of SIP application service, SIP application platform represents collection of SIP server, Redirect server, registrar server, etc. This service platform may use core network provided network services when appropriate. Some such services include change in network resources, policy updates, location updates, etc. Similarly, the application service platform supporting H.323 protocol may consist of H.323 gateway, gatekeeper, etc. The H.323 gatekeeper or gateway (H.323 application platform) may interface with the core network components as described earlier in case of SIP application service. Thus, the protocol server interfaces with the NGN architecture is independent from the type of protocol servers (SIP or H.323 among considered here) that may be providing protocol services to the end users.

The list of network preferred protocol preferences could be provided to the mobile host during an access session establishment. The service-session management role function of the NGN architecture provides addresses of such allied application servers (including addresses of the protocol servers). This also provides an opportunity to an access network service provider to offer first portal service preference to the end users. However, third party application server may change or provide additional such preferences to provide network independent services to the end user. Also, the end users may choose manually any other services those are advertised independently.

The service session management role that is provided by the NGN architecture consists of following:
To facilitate resources during an access session establishment, and appropriate network resources to establish transport session based on the subscriber's capabilities and the network preferences.
Such activities include:
Facilitating to push appropriate client applications to the end users.
Facilitating to create an instance of a service session manager that provides the capability to the end user to interface with an access network provider (e.g. for dynamic updates to QoS etc.). Such instance can be present at the allied service application server or at functional component within the core network that are capable to provide such services.
Facilitating to create an instance of an accounting session based on the subscriber's default parameters that is to be remained active during entire access session period.
Provide policy decision functions based on the subscriber's profile and network's available resources and preferences.
To facilitate resources during service session invocation based on the end users' and or application servers' request Such activities include:
Facilitating to push appropriate client applications to the end users and/or providing subscribers' information (e.g. subscribers' profile, location information, etc.) to the application servers
Facilitating to create an instance of a service session manager that provides the capability to the application servers to interface with an access provider (e.g. for dynamic updates to QoS etc.)
Facilitating to create an instance of an accounting session based on the service session invoked that is to be remained active during entire active service session
Provide policy decision functions based on the subscriber's profile and network's available resources and preferences As discussed earlier that the session management role function of the NGN architecture provides network services using publicly available protocols. Such protocols include use of RSVP, DNS query, AAA+ access, LDAP, etc. Thus, for an example, an allied SIP protocol application server desires to get authorization to provide service to an end user based on higher QoS requirement, it can send authorization request to the AAA+ server. The authorization server may access policy management function of the session management and perform appropriate QoS update before sending authorization accept or reject to the requesting application server.

Thus, it is clear that the NGN architecture is independent from any specific protocol used. An end user or protocol servers (application server) acting as a user client (proxy function) interface with the service session management functions of the NGN architecture will use network services for the network resources and policy decisions. An end user or a protocol server assumes call/session control activities to extend or to establish call/session to the terminating end.
Scenarios—All IP Network Invocation of service session scenario—It is assumed that once the mobile host establishes a point of attachment with the serving network, the mobile host becomes capable of invoking any services. The serving network also locally or globally provides available services. However, the mobile host can access any IP addressable device. Thus, the mobile host has the choice to take advantage of locally available access network provided services or other third party provided services. Please note that when the mobile user invokes a service to an application service platform (allied), an application service platform may take advantage of the serving core network functions. When an application server interfaces with the core network components, an appropriate service session management instance of a service session is created. Additionally, based on the service instance, a transport session is also created at the connection management entity.

Only a few basic services have been described that the network can provide. However, the network is also flexible enough to provide more complex services. Thus, as discussed earlier, the NGN architecture is IP centric and capable of providing various services. Such services include circuit switched and packet data services. The invocation of service session concept allows invoking multimedia and simultaneous calls. A brief discussion is provided here for reference.

The serving network provides user capabilities and network preferences to the user. The user capabilities were determined during the access session establishment as a result of executing subscriber management services. The network preferences based on network capabilities are then pushed to the mobile client. Such preferences may include choice of invoking different types of call control services (VoIP, data, multi-media, etc.) or value added services (Intranet services, location-based services, WAP application, etc.). Moreover, the serving network can provide a choice to the mobile host of using the serving network as an ISP provider, or other possible options.

Assuming that access has been established and the end terminal is configured to be IP capable, the following paragraphs will describe a few scenarios. Standard architectural data flow diagrams are used as the mechanism for presenting the scenarios. The use of RAN is shown as an example. However, any access (xAN) can be considered.

Since no specific protocol is assumed, the message labels are generic and of use with any protocol. Major parameters within each message are described within the description. However, this is not intended to be a complete set of the parameters required.

Scenario Assumptions:
1. Prior to the service invocation, the MH has performed the registration sequence. This sequence includes user authentication, location updates to identify the MH to the serving LSF and makes its current location known to the home NSF, user capabilities download, RAN notification to identify the MH IP and layer 2 addresses, routing table updates, and registration reply.
2. The current location of the MH is stored within DNS.
3. Prior to service invocation, the MH is allocated default resources within the RAN such as bandwidth, channel assignment, etc. This is assumed to occur during the terminal registration sequence.
4. The messaging between the Call Server and Media Gateway is assumed to be MEGACO standard. Thus, the MEGACO message names are used but can also be used to generically represent any other protocol.
5. The messaging between the Call Server and the Signaling Gateway is assumed to be IPS7 standard. Thus, SS7 message names are used but can also be used to generically represent any other protocol.
6. The messaging between the Call Server and PSTN is shown as an example only. In reality, the order of the messages and types of messages sent and received could vary greatly based on various network conditions.
7. Recursive DNS is assumed. In other words, the local DNS will query the Home DNS on behalf of the application if the data is not available locally.

Registration—Policy Rules Instantiation at LSF

User registration consists of the following three procedures: Authentication, Registration and Registration Reply. Authentication consists of validation of the identity of the user and/or device. Registration consists of the establishment of an access session including current address update. Registration Reply is a reply to the MH with user profile data.

Specific to SSM, the policy rules associated with the specific user (if available) are downloaded from the user's home NSF to the LSF serving the RAN where the user currently resides. This allows the Policy Manager at the LSF to serve the role of policy decision point (PDP) for the RAN. If the policy rules are not defined, a generic default set of rules will be used. The RAN serves the role of the policy enforcement point (PEP) and will request decisions from the LSF Policy Manager.

This download of policy rules was not originally depicted in the registration scenarios. Thus, the scenario diagram in FIG. 8 includes specific augmentation to depict policy download. New messages and new parameters within existing messages are also depicted in dotted line with italic font. Additionally, only the description text associated with the augmented portion of the diagram is included.

The "profile" data parameter downloaded from the NSF to the MH is also assumed to contain the user capabilities list including a list of operator LSF services that may be invoked. This list identifies what operator services are available to the MH.

After retrieving the user profile, the Home Mobility Manager (HMM) issues the GET_POLICY_RULES message to the NSF Policy Manager. The Policy Manager then forwards the request to the Directory Server. The Directory Server then retrieves the policy data from UDS and returns it to the Policy Manager. The Policy Manager forwards it to the HMM. Additionally, the HMM includes the policy rules within the REGISTRATION RESP message returned to the Home AAA+.

Upon receiving the REGISTRATION_RESP message, the serving MM extracts the policy rules data and formulates the POLICY message and sends it to the LSF Policy Manager. This instantiates the LSF Policy Manager as the policy decision point (PDP) for any QoS requests coming from the MH. Note: if policy data is required in the RAN for optimization of policy queries, it can be delivered on the REGISTRATION_RESP message as an additional parameter or embedded within the user profile. The Policy Manager then responds to the serving MM.

Originating Voice Session—IP Mobile Host to Land

Figure 9:
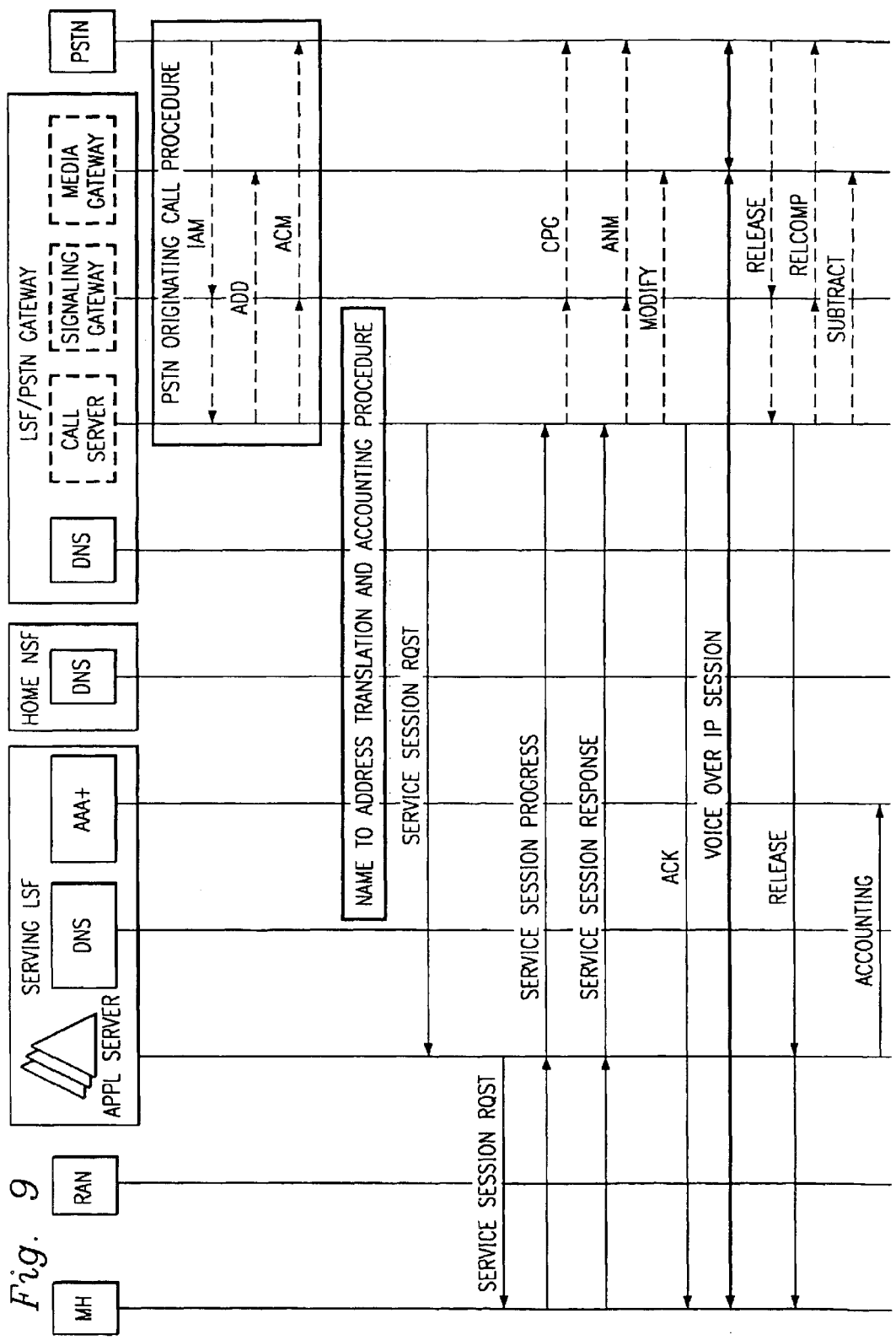
FIG. 9 is a diagram of the Originating Voice Session—IP Mobile Host to Land.

As depicted in FIG. 9, an outgoing voice session from an IP-enabled mobile host (MH) to the PSTN occurs when the mobile host dials a number or enters an NAI that is currently being served by the PSTN. The access interface functions in the RAN provide the air link communication with the mobile host. The core network sub-layers LSF and NSF provide the necessary session management functionality for the mobile host.

Specific to the SSM, the Application Server is responsible for performing the role of the telephony call server in a voice application. It performs name to address translation, accounting logs, extends the session to the terminating side, and forwards progress messages to the MH. In this scenario, the terminating side is a Call Server. DNS queries are used to obtain the IP address of the terminating side. Moreover, AAA+ server accepts and stores accounting information associated with the session.

A Call Server provides the legacy call model logic required interfacing to the PSTN. The Call Server interacts with the Signaling Gateway (aka SS7 Gateway) component for conversion of the IP messages to/from SS7 signaling into the PSTN. The Call Server also interacts with the Media Gateway (aka Circuit Gateway) for voice circuit bearer path establishment and control.

The MH invokes a service session request. The request is routed to the IP address for the service configured during the Registration sequence. For requests requiring some level of operator service, the IP address configured is that of an Application Server providing the requested service (i.e. telephony).

The Application Server performs the Name to Address Translation and Accounting procedure as follows:
- a. The terminating address given to the Application Server by the MH is in NAI form (user@realm), thus requires translation to an IP address. For an IP Mobile to Land voice session, the terminating address is expected to be something similar to DN@PSTNcode (e.g. 6842419@972). The Application Server sends the DNS_QUERY message to the local DNS. The purpose of this message is to obtain the IP address associated with the called (terminating) NAI. The local DNS performs a lookup on the terminating NAI.
- b. The response with the IP address matching the terminating address is created by DNS and returned to the Application Server. In the case of a service session terminating to the PSTN, the returned IP address will correspond to a Call Server responsible for the particular trunk group. In the case of a service session terminating to another IP-enabled mobile, the returned IP address will correspond directly to the terminating MH or a suitable proxy. At this point, the Application Server has both the IP address of the originator (MH) and the terminator (Call Server).
- c. The Application Server issues an accounting log to the local AAA+ components indicating the start of a mobile to land call.

1. The Application Server "extends" the service session request by sending it to the terminating address returned during the name to address translation.
2. The Call Server creates the ADD message indicating the need to create a call context and sends it to the Media Gateway. The Media Gateway allocates bearer path resources and assigns an RTP port number for the call.
3. The Call Server creates the Initial Address Message (IAM) and sends it to the Signaling Gateway. The IAM announces to the PSTN that an originating call is attempted. The Signaling Gateway strips off the IP header and sends an IAM message to the PSTN.
4. The PSTN returns the Address Complete Message (ACM) to the Signaling Gateway. The ACM indicates that the terminating side is ready to accept the originating call. The Signaling Gateway forwards the message to the Call Server.
5. The PSTN returns the Call Progress Message (CPG) to the Signaling Gateway. The Signaling Gateway forwards the message(s) to the Call Server. This message indicates the progress (i.e. ringing, forwarded, busy, etc.).
6. The Call Server sends the SERVICE_SESSION_PROGRESS message to the Application Server reporting the progress of the session. The Application Server forwards the progress to the MH (if required).
7. When the call is answered, the PSTN returns the Answer Message (ANM) to the Signaling Gateway. The Signaling Gateway forwards the message(s) to the Call Server.
8. The Call Server creates the MODIFY message indicating the need to modify the call context within the Media Gateway and sends it to the Media Gateway.
9. The Call Server sends the SERVICE_SESSION_RESPONSE message to the Application Server reporting the answer. This message indicates that the call has been answered and includes the RTP bearer path port number and IP address of the Media Gateway for the MH to use. The Application Server forwards the message to the MH.
10. The MH acknowledges receipt of the service session response.
11. The Voice over IP session is now enabled from the MH to the PSTN terminating device. The bearer path flow is accomplished within the Media Gateway component via the RTP port number and the IP address of the Media Gateway. The MH can send IP packets directly to the Media Gateway and identify the session using the RTP port number.
12. Eventually, the MH releases the session by sending a message to the Application Server serving this call. The Application Server forwards the release message to the Call Server for terminating side de-allocation.
13. The Call Server creates the RELEASE message and sends it to the Signaling Gateway. The Signaling Gateway strips off the IP header and sends the RELEASE message to the PSTN.
14. The PSTN returns the RELEASE COMPLETE message to the Signaling Gateway. This message indicates that the terminating side has de-allocated the bearer resources. The Signaling Gateway forwards the message to the Call Server.
15. The Call Server creates the SUBTRACT message indicating the need to delete the call context and sends it to the Media Gateway. The Media Gateway then de-allocates bearer path resources for the session.
16. The Application Server issues an accounting log indicating the end of a mobile to land session to the local AAA+ component.

Terminating Voice Session—Land to IP Mobile Host

Figure 10:
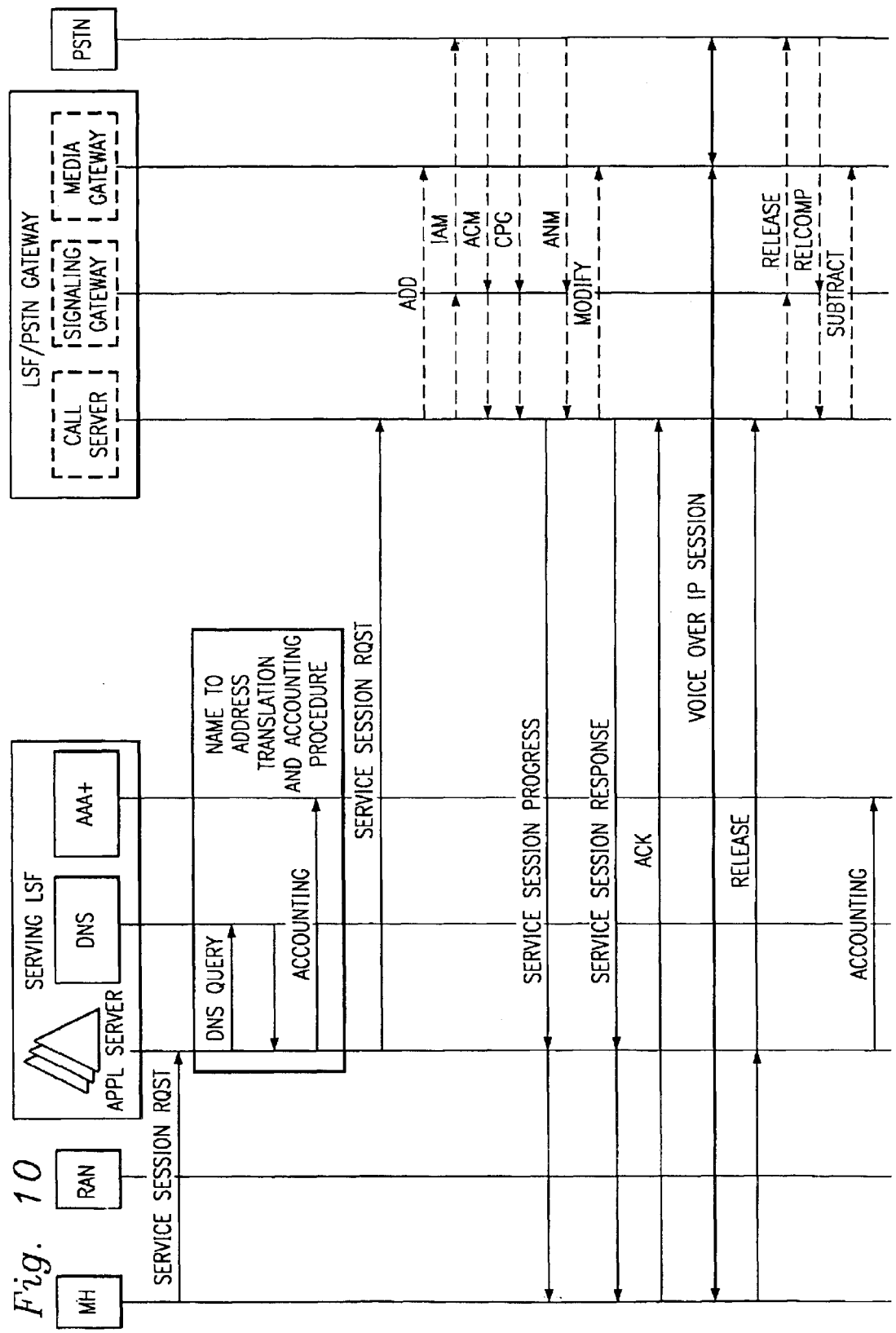
FIG. 10 is a diagram of the Terminating Voice Session—Land to IP Mobile Host.

Now referring to FIG. 10, a terminating voice session to an IP-enabled mobile host (MH) occurs when an originating PSTN user dials a number associated with an IP-enabled MH and requests a call. The access interface functions in the RAN provide the air link communication with the mobile host. The core network sub-layers LSF and NSF provide any necessary session management functionality for the mobile host.

Specific to SSM, the Application Server is responsible for routing messages to the terminating side. In this scenario, the terminating side will be the MH. DNS queries are used to obtain the IP address of the terminating side. AAA+ server accepts and stores accounting information associated with the session.

The Call Server provides the legacy call model logic required to interface into the PSTN. The Call Server interacts with the Signaling Gateway (aka SS7 Gateway) component for conversion of the IP messages to/from SS7 signaling into the PSTN. The Call Server also interacts with the Media Gateway (aka Circuit Gateway) for voice circuit bearer path establishment and control.

1. The PSTN Originating Call procedure is performed as follows:
   - a. The PSTN informs the Signaling gateway that a call is requested to be terminated using the IAM message. The Signaling Gateway sends the IAM to the Call Server for processing.
   - b. The Call Server creates the ADD message indicating the need to create a new call context and sends it to the Media Gateway. The Media Gateway allocates bearer path resources and an RTP port number for the call.
   - c. The Call Server creates and sends the Address Complete Message (ACM) to the Signaling Gateway. This message indicates that the Call Server is prepared to terminate the call. The Signaling Gateway forwards the message(s) to the PSTN.
2. The Call Server performs the Name to Address Translation and Accounting procedure as described previously. The terminating address given to the Call Server by the PSTN is in DN form (e.g. 9722965555), thus requires translation to an IP address; more specifically to the current IP address of the MH, or in the least the LSF Application Server serving the MH.
3. The Call Server builds a SERVICE_SESSION_RQST message and sends it to the Application Server. The Media Gateway IP address and RTP port number allocated for this session is included as a message parameter.
4. The Application Server "extends" the service session request by sending it to the address returned during name to address translation. This address will be the address of the IP-enabled MH.
5. The MH can send the SERVICE_SESSION_PROGRESS message to the Application Server reporting the progress of the session. The Application Server forwards the progress to the Call Server if required.
6. The Call Server creates and sends the Call Progress Message (CPG) to the Signaling Gateway. The Signaling Gateway forwards the message to the PSTN. This message indicates the progress of the call (i.e. ringing, forwarded, busy, etc.).
7. When the call is answered, the MH sends a SERVICE_SESSION_RESPONSE message to the Application Server. This is forwarded to the Call Server. This message includes the IP address of the MH.
8. The Call Server creates and sends the Answer Message (ANM) to the Signaling Gateway. The Signaling Gateway forwards the message to the PSTN.
9. The Call Server then creates the MODIFY message indicating the need to modify the call context within the Media Gateway and sends it to the Media Gateway.
10. The Call Server acknowledges receipt of the service session response.
11. The Voice over IP session is now enabled from the MH terminating device to the PSTN. The bearer path flow is accomplished within the Media Gateway component via an RTP port number and the IP address of the Media Gateway. The MH can send IP packets directly to the Media Gateway and identify the session using the RTP port number.
12. Eventually, the PSTN releases the session by sending the RELEASE message to the Signaling Gateway. This message indicates that the PSTN device has hung up. The Signaling Gateway forwards the release message to the Call Server.
13. The Call Server then sends the RELEASE message to the Application Server. The Application Server forwards the release to the MH.
14. The Call Server returns the RELEASE COMPLETE message to the Signaling Gateway. The Signaling Gateway forwards the message to the PSTN.
15. The Call Server creates the SUBTRACT message indicating the need to delete the call context and sends it to the Media Gateway. The Media Gateway de-allocates bearer path resources for the session.
16. The Application Server issues an accounting log indicating the end of a land to mobile session to the local AAA+ component.

Originating Session—IP Mobile Host 1 to IP Mobile Host 2

An outgoing session from an IP-enabled mobile host (MH1) to an IP-enabled mobile host (MH2) occurs when one mobile host invokes a service directed to a receiving mobile host.

This scenario is a combination of the previous two scenarios—originating and terminating voice session from/to the MH, thus will not be repeated here. The only primary difference is that there is no Call Server PSTN interaction.

Originating Data Session—IP Mobile Host to Web Server

Figure 11:
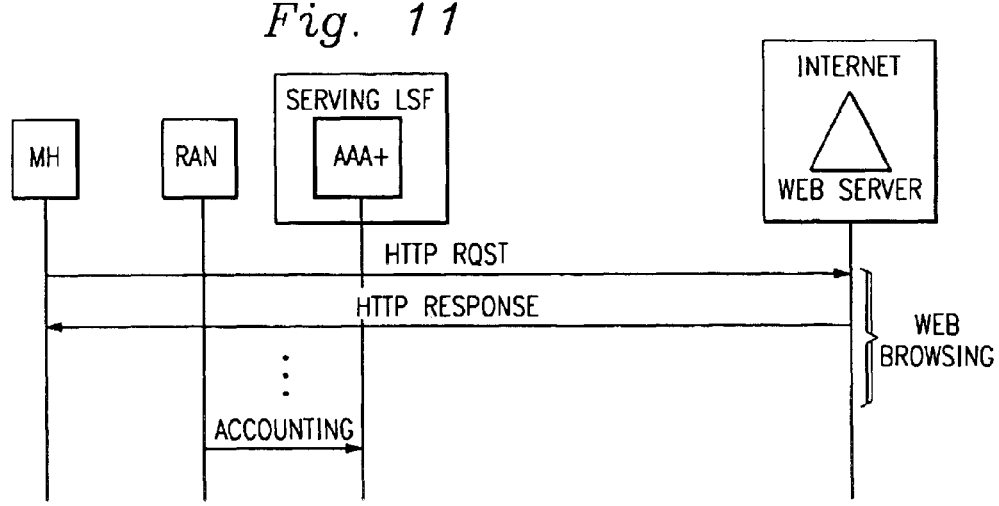
FIG. 11 is a diagram of the Originating Data Session—IP Mobile Host to Web Server.

Now referring to FIG. 11, in order to show the application agnosticism of the NGN core network, several examples are now shown of data services. It is important to understand that the underlying transport protocol of these data services enabled is TCP or UDP with IP at the network layer. Thus, any data service-utilizing IP is enabled within the core network architecture.

The first example of a data session is from an IP Mobile Host to a Web Server. An outgoing data session from an IP-enabled mobile host (MH) to a Web server occurs when the mobile host invokes a data service provided by a server. The access interface functions in the RAN provide the air link communication with the mobile host.

This interface will occur relatively transparent to the LSF and NSF. Only the AAA+ server in the LSF (and possibly the NSF) is involved in receiving an accounting log of the session. Some additional assumptions are listed in the following paragraphs.

For illustrative purposes, a Web Server is shown as the data server. The Web server interacts directly with the MH just as with any other Web client, providing data and responses using HTTP protocol.

The Internet DNS name to address translation occurs within the Internet block and is not shown.

The MH is assumed to be configured with a web browser.

The RAN will inform the AAA+ Server of an accounting log based on usage billing or periodic basis.
1. The MH, acting as an web client, sends an HTTP request directly to an Internet web server using the server's URL or IP address.
2. The web server responds.
3. The web browsing session is now underway from the MH to the web server directly.
4. The RAN eventually issues an accounting log noting the usage of this session to the local AAA+ component.

Originating Data Session—IP Mobile Host to FTP Server

Figure 12:
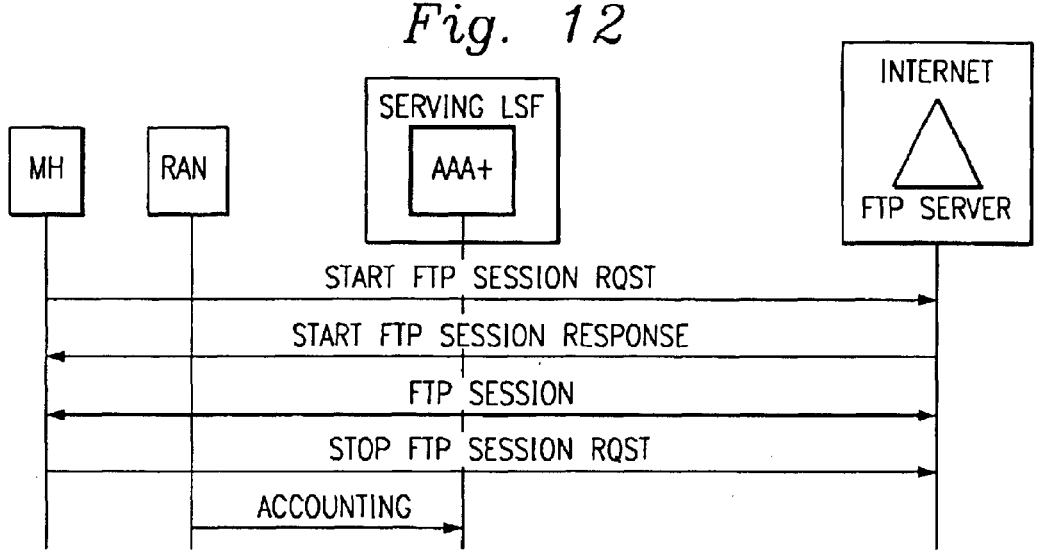
FIG. 12 is a diagram of the Originating Data Session—IP Mobile Host to FTP Server.

Another example of a data session is from an IP Mobile Host to an FTP Server as depicted in FIG. 12. An outgoing data session from an IP-enabled mobile host (MH) to a data server occurs when the mobile host invokes a data service provided by a server. The access interface functions in the RAN provide the air link communication with the mobile host.

This interface will occur relatively transparent to the LSF and NSF. Only the AAA+ server in the LSF (and possibly the NSF) is involved in receiving an accounting log of the session. Some additional assumptions are listed in the following paragraphs.

For illustrative purposes, an FTP Server is shown as the data server. The FTP server interacts directly with the MH just as with any other FTP client, providing file transfer and directory structure information via FTP protocol.

The internet DNS name to address translation occurs within the Internet block and is not shown.

The MH is assumed to be configured as an FTP client.

The RAN will inform the AAA+ Server of an accounting log based on usage billing or periodic basis.
1. The MH, acting as an FTP client, sends a Start FTP Session request directly to an Internet FTP server using the server's name or IP address.
2. The FTP server responds and the FTP session commences. The FTP session is now enabled from the MH to the FTP Server directly. FTP commands such as "get", "put", "cwd""pwd", "list", etc. are initiated by the MH and answered by the FTP Server with responses and/or data transfer.
3. The FTP session is ended by the issuance of the Stop FTP Session request (i.e. FTP "quit" command) by the MH.
4. The RAN eventually issues an accounting log indicating or including the usage of this session to the local AAA+ component.

Terminating Data Session—FTP Client to IP Mobile Host

Figure 13:
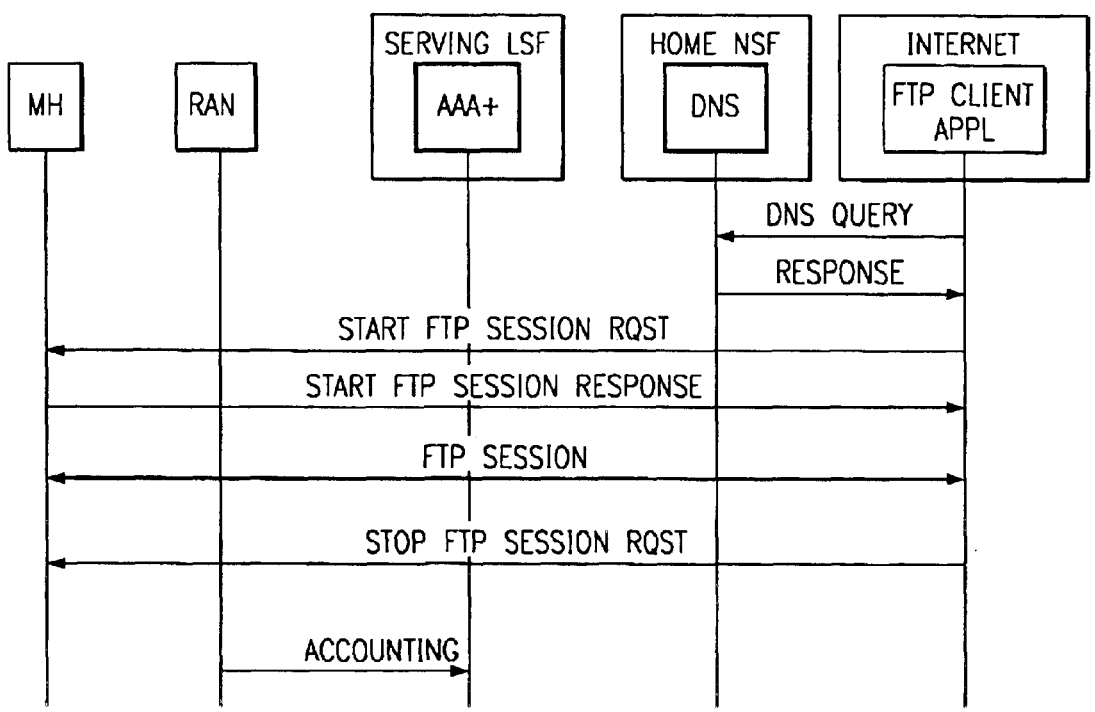
FIG. 13 is a diagram of the Terminating Data Session—FTP Client to IP Mobile Host.

Now referring to FIG. 13, an incoming data session from a data client to an IP-enabled mobile host (MH) occurs when the client invokes a data service provided by the MH. The access interface functions in the RAN provide the air link communication with the mobile host.

Specific to SSM, DNS queries are used to obtain the current IP address of the MH. AAA+ server accepts and stores accounting information associated with the session. Some additional assumptions are listed in the following paragraphs.

For illustrative purposes, an FTP Client Application is shown as the data client. The FTP Client Application interacts directly with the MH just as with any other FTP server, requesting file transfer and directory structure information.

The FTP Client Application has the ability to query DNS for the current IP address of the MH. This IP address is then used by the FTP client portion of the software within the application to initiate an FTP session.

Once the current IP address is obtained, the data packets are routed through the LSF and RAN using IP Mobility (not shown).

The MH is assumed to be configured as an FTP server.

The RAN will inform the AAA+ Server of an accounting log based on usage billing or periodic basis.

1. The FTP Client Application must obtain the current location of the IP Mobile. The FTP Client Application sends the DNS_QUERY message to the MH's home DNS. The purpose of this message is to obtain the current IP address associated with the MH. The DNS performs a lookup on the terminating MH.
2. The response with the IP address matching the terminating MH is created by DNS and returned to the FTP Client Application.
3. The FTP Client Application then sends a Start FTP Session request directly to the MH using the current IP address.
4. The MH responds and then the FTP session commences. The FTP session is now enabled from the FTP Client Application to the MH (acting as an FTP server) directly. FTP commands such as "get", "put", "cwd", "pwd", "list", etc. are initiated by the FTP Client Application and answered by the MH with responses and/or data transfer.
5. The FTP session is ended by the issuance of the Stop FTP Session request (i.e. FTP "quit" command) by the FTP Client Application.
6. The RAN eventually issues an accounting log indicating or including the usage of this session to the local AAA+ component.

Terminating Voice Session—Land to "Roaming" IP Mobile Host

Figure 14:
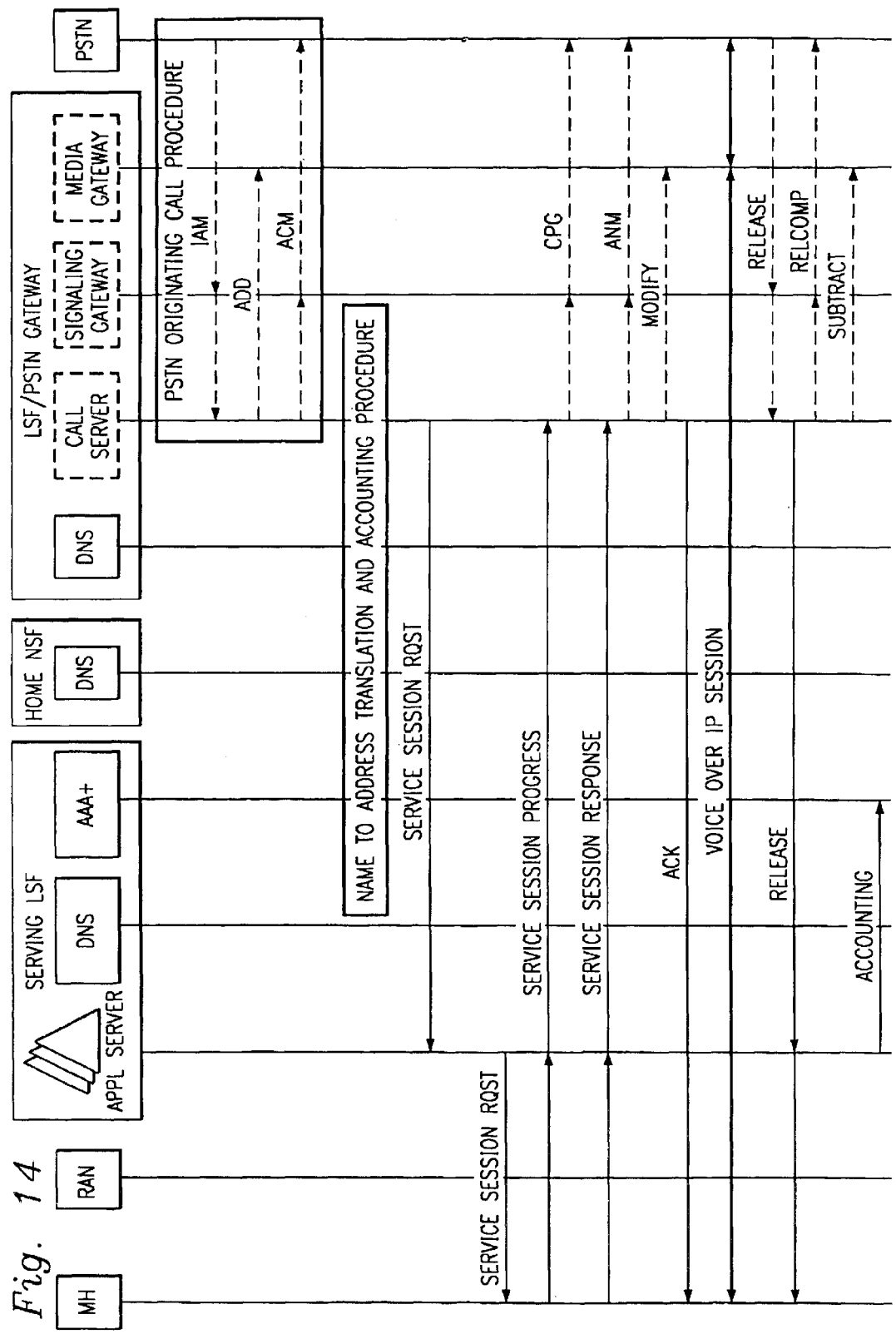
FIG. 14 is a diagram of the Terminating Voice Session—Land to Roaming IP Mobile Host.

The scenario for a land to roaming IP mobile host is similar to the Terminating Voice Session—Land to IP Mobile Host scenario. When a mobile host roams into a new LSF, it automatically registers itself This results in the MH's current location being stored at its new LSF and its home NSF within DNS. Thus, any queries to the DNS at its home NSF will return the MH's current IP address. Then, the PSTN call can be delivered directly to the MH. The diagram is repeated in FIG. 14 for completeness.

Terminating Data Session—FTP Client to "Roaming" IP Mobile Host

Figure 15:
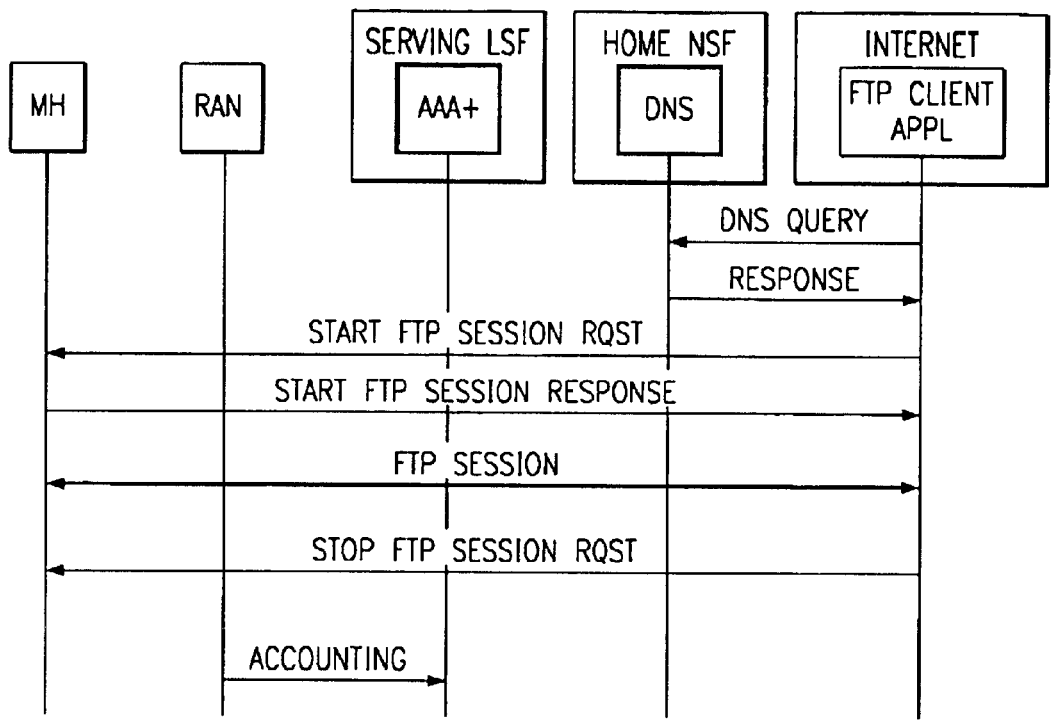
FIG. 15 is a diagram of the Terminating Data Session—FTP Client to Roaming IP Mobile Host.

The scenario for a terminating data session to a roaming IP mobile host is similar to the Terminating Data Session—FTP Client to IP Mobile Host scenario. When a mobile host roams into a new LSF, it automatically registers itself. This results in the MH's current location being stored at its new LSF and its home NSF within DNS. Thus, any queries to the DNS at its home NSF will return the MH's current IP address. Then, the PSTN call can be delivered directly to the MH. The diagram is repeated in FIG. 15 for completeness.

Handoff

In a handoff scenario, the handoff is accomplished by informing the old LSF to prepare for a system change, and then performing procedures for authentication, context establishment, registration, registration reply, and binding updates between the MH, RAN, new LSF, and the user's home NSF. The MH also informs its correspondent nodes of its new care of address (COA). IP packets to the MH arriving at the old LSF after the handoff has been initiated are queued and then delivered to the new LSF once the handoff is complete. After delivering any queued packets to the MH, the new LSF allows new packets to be delivered.

Dynamic Modification of QoS

Figure 16:
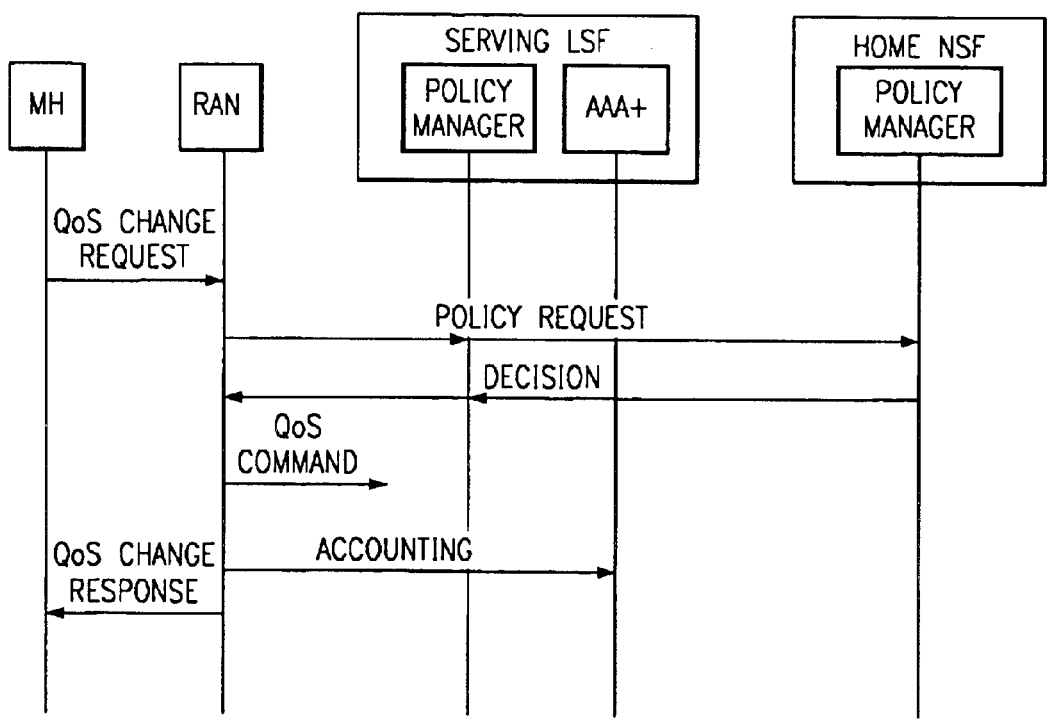
FIG. 16 is a diagram of of the Dynamic Modification of QoS.

Now referring to FIG. 16, at any point during a service session, an IP-enabled Mobile Host (MH) can request a Quality of Service (QoS) modification. The access interface functions in the RAN provide the air link communication and resource management with the mobile host. The core network sub-layers LSF and NSF provide the necessary session management functionality for the mobile host specific to QoS.

Specific to SSM, the Policy Manager performs the policy decision point (PDP) function. The RAN acts as the policy enforcement point (PEP). If the request is allowed, the RAN adjusts the current resource allocation to what was requested.

1. The mobile host initiates the dynamic QoS modification by creating the QoS_CHANGE_RQST message and sending it to the RAN.
2. A request to change the QoS settings to something other than the default settings will result in the invocation of a policy decision:
   a. The RAN sends the POLICY_RQST message to the local Policy Manager. The Policy Manager performs a lookup on the policy associated with this user. If the policy is not present at the local level, the local Policy Manager forwards the request to the user's home Policy Manager. The POLICY_RQST is a request for information on how to manage a session for the user and contains information such as bandwidth desired, class of service, admission control, accounting type, connection types allowed (point to point, point to multipoint), layer 2 setup parameters, etc.
   b. The policy decision is made and returned to the RAN.
3. The RAN enforces the policy decision as indicated. Assuming the decision is to allow the update, the RAN (if directed by the policy decision) re-allocates the required resources for the air interface using the appropriate network infrastructure components.
4. The RAN also (if directed by the policy decision) re-allocates a reserved end-to-end network path using QoS protocol to establish guaranteed QoS and flow control. This is shown on the diagram as the QoS_COMMAND. This command traverses to multiple routers (not shown).
5. The RAN reports the QoS change by creating the ACCOUNTING message and sending it to the local AAA+.
6. The RAN creates the QoS_CHANGE_RESP message and sends it to the requesting MH.

In sum, the NGN architecture was described with respect to the call/session management perspective. The NGN architecture is flexible and modular enough to support the recommended TINA service architecture concept of separation that suggests establishing an access session, an invocation of a service session, and establishing a transport session.

The NGN architecture truly facilitates the need of multimedia services. The functional components within the core network can provide configuration from simple to complex based on the network scalability and extendibility requirements. The core functional components remains de-coupled from the access and transport activities. The NGN architecture is flexible enough to provide an end user a choice to select accessed network provided services or third party provided services. Also, it is flexible enough to setup virtual home environment for the user and allows a user to reach home directly without network intervention. Additionally, the NGN architecture is also flexible enough to interface with other legacy systems through the use of appropriate gateways.

The NGN architecture leverages on the publicly available IETF protocols. This adds value to a faster development cycle and avoids fear of proprietary and obsolete implementation.

The NGN architecture is also a distributed IP centric network. The major functions are distributed in service layers and in different functional components. These functional components interface with each other using application layer protocols. Various protocols are defined based on the functions of each component. Most of the IP protocols are defined in IETF open standard forum. These protocols are generic in nature and designed to support a variety of applications.

The following few points provide a validity check with respect to the identified implications. First. the call/session management activities leverage on SIP and/or H.323 protocols. The NGN architecture is modular and flexible to adopt any of these protocols and generically suitable to adopt for variety of applications. The SIP protocol server, H.323 gateway or gatekeeper can access core network functional components using publicly available standard protocols for the service session management functions identified in this document.

Second, the functional components interface with each other using different applicable protocols. Protocols between different functional components are being evolved from traditionally used protocols to newly defined protocols. One example is that the next generation IP based network is now viewed based on the policy rules. In this paradigm, based on the policy rules, for any specific condition, a specific action is provided. For this purpose, the policy enforcement point uses policy management services to fetch policy decision. The COPS protocol is being considered between PEP and PDP. However, the NGN architecture can adopt traditional implementation based on SNMPv3 in order to expedite use of this concept.

Similarly, the use of AAA+ for the authentication, authorization, and accounting function is done with use of the DIAMETER protocol. However, a policy-based concept that uses COPS protocol for the same purpose is being considered for the next generation network.

Each new service provided requires a unique proxy serer. The NGN architecture is flexible enough to support multiple service application servers. Thus, any unique application server that is associated with a specific service can easily interface with the NGN architecture. Additionally, the end user can use access network allied service applications as well as any service applications available on Internet.

Timing and performance—IP protocols are based on application layer protocols. Moreover, use of TCP vs. UDP plays significant role in tradeoffs for reliability vs. real time issues respectively. Thus, it is crucial to determine the appropriate use of NGN architectural functional components and interactions to achieve optimal performance based on the type of services.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for a first user to communicate in an Internet Protocol (IP) centric distributed network with a plurality of service layers providing a plurality of functions associated with each of the service layers, the method comprising:

accessing the network to establish a point of presence through an access interface layer at an access management layer and a core portion of the network and to designate a default amount of bandwidth and a plurality of default setup parameters, wherein the access management layer is access technology independent and the access interface layer is access technology specific;

invocating service through an allied application server on the network to establish an amount of network resources requested by the first user, wherein the allied application server manages any changes requested by the first user to the quality of service parameters and bandwidth amount through the core network; and establishing a transport session to create and manage a connection from the first user to a destination address.

2. The method of claim 1 wherein the plurality of service layers includes a network service function layer.

3. The method of claim 2 wherein the network service layer includes a mobility manager that provides handoff services to the first user when the first user leaves the local service function layer for another local service function layer.

4. The method of claim 1 wherein the plurality of service layers includes a local service function layer.

5. The method of claim 4 wherein the local service layer includes a mobility manager that provides handoff services to the first user when the first user leaves an access management layer for another access management layer.

6. The method of claim 1 wherein the plurality of service layers includes an access service function layer.

7. The method of claim 6 wherein the access service function layer accommodates a plurality of technologies used for the first user to communicate to the network.

8. The method of claim 6 wherein the access management layer includes a location tracking server that provides handoff services to the first user when the first user leaves a first cell in a first access interface layer for another cell in another access interface layer.

9. The method of claim 1 wherein the invocating service through the application server includes providing a list of a plurality of functions available to the first user.

10. The method of claim 9 wherein the plurality of functions available to the first user are based on capabilities of the first user and a plurality of network preferences.

11. The method of claim 1 wherein an access and a termination functions at an access management layer reserves any quality of service parameters and an amount of bandwidth requested by the first user.

12. The method of claim 1 further including sending communications from an application layer at the first user wherein an user agent client resides at the first user.

13. The method of claim 1 further including sending communications from a network layer at the first user wherein an user agent client resides at an access management layer of the access layer.

14. The method of claim 1 further including an user agent server associated for each of a plurality of access interface layer of the access layer.

15. The method of claim 1 further including an user agent server that acts as a gateway by converting incoming protocols of incoming communications to a protocol understood by the first user.

16. The method of claim 1 further including an user agent server that delivers incoming protocols of incoming communications to the first user when the incoming protocol is understood by the first user.

17. The method of claim 1 wherein the network includes a connection management server that can transport communications on a plurality of backbone infrastructures.

18. The method of claim 1 wherein the network includes a connection management server that can transport communications on a point to point basis.

19. The method of claim 1 wherein the network includes a connection management server that can transport communications on a point to multi-point basis.

20. The method of claim 1 further including providing the requested amount of network resources by utilizing a connection management server that utilizes a plurality of protocols to deliver a requested quality of service for latency.

21. The method of claim 1 further including providing the requested amount of network resources by utilizing a connection management server that utilizes a plurality of protocols to deliver a requested bandwidth.

22. The method of claim 1 further including deciding policy parameters at a core network level.

23. The method of claim 22 further including enforcing policy parameters at an access management level.

24. The method of claim 1 wherein a plurality of access management layer components interact with a network layer of the first user to establish an access session.

25. The method of claim 1 wherein a plurality of access management layer components interact with a plurality of components to bring the mobile host on the traffic channel.

26. The method of claim 1 wherein a plurality of access management layer components interact through a connection management component to establish point to point protocol path that allows the first user to access any other IP capable device through a serving network.

27. The method of claim 1 wherein a plurality of network preferred call/session control services are handled through a plurality of access management components.

28. The method of claim 1 wherein handoff, power control, and paging functions related handshakes with the first user are controlled by a plurality of access management components.

29. The method of claim 1 wherein the first user interacts with a plurality of allied protocol servers and access management service layer components.

30. The method of claim 29 wherein the plurality of protocol servers and access management service layer components interact with a plurality of components at the local service function layer.

31. The method of claim 1 wherein a plurality of components at a local service function layer provide specific services to a plurality of access management components during establishment of an access session and service session with the first user.

32. The method of claim 1 wherein the accessing includes providing subscriber management and policy decision services for the first user.

33. The method of claim 1 wherein policy decision services are provided for the first user during user session invocation.

34. The method of claim 1 wherein Intranet services are provided to the first user by a local service function layer through specialized application servers.

35. The method of claim 1 wherein the first user interacts with a plurality of global network service components.

36. The method of claim 1 wherein the accessing further includes a network service function layer providing services to a local service function layer.

37. The method of claim 1 further including providing subscriber management services during an access session establishment for the first user.

38. The method of claim 1 where the first user is capable of accessing publicly available services.

39. The method of claim 1 wherein the first is capable of direct home network accesses.

40. The method of claim 1 further including enforcing the accounting and billing policies for services and collecting and reporting the charging data to an operator's billing system.

41. The method of claim 1 further including accounting clients at the application servers facilitating accounting activities at a service level for the first user.

42. The method of claim 1 further including accounting clients at the access management layer facilitating the collection of usage data reported to the accounting server at the core network for accumlation.

43. The method of claim 1 further including interfacing with a storage device to fetch collected data in order to create a customer billable record.

44. A communications network architecture for an Internet Protocol centric wireless network for a first user to communicate with a destination, the architecture comprising:
　a radio access network including:
　　an access interface layer configured for communication with a mobile device associated with the first user and
　　an access management layer coupled to the access interface layer and configured to manage communications between the access interface layer and a core network, wherein the access management layer is access technology independent and the access interface layer is access technology specific;
　a core network connected to the access management layer, the core network configured to control network resources associated with the mobile device and maintain user and network information associated with the mobile device;
　an allied application service platform that forms an intranet network connected to the core network, the allied application service platform configured to access the user and network information maintained by the core network to provide application specific services to an application located on the mobile device, wherein the services are customized for the user by the allied application service platform based on the user and network information; and
　an application service platform within the Internet independent from the core network and connected to the access management layer, the application service platform configured to provide application specific services to an application located on the mobile device without having access to the user and network information maintained by the core network.

45. The architecture of claim 44 wherein the application service platform within the intranet is allied with the core network.

46. The architecture of claim 44 wherein the application service platform within the Internet is not allied with the core network.

47. The architecture of claim 44 wherein the access management layer receives service requests from the first user.

48. The architecture of claim 44 wherein the core network receives service requests from the first user.

49. The architecture of claim 44 wherein the intranet network receives service requests from the first user.

50. The architecture of claim 44 wherein the intranet network includes a plurality of independent service providers and wherein the plurality of independent service providers are allied with the core network.

51. The architecture of claim 44 further including independent service providers outside the core network.

52. The architecture of claim 44 wherein the allied application service platform in connection with the core network provides feature analysis.

53. The architecture of claim 44 wherein the access management layer provides enforcement of the first user's preferences and capabilities.

54. The architecture of claim 44 wherein the core network provides dynamic provisioning of Quality of Service.

55. The architecture of claim 44 wherein the core network provides dynamic provisioning of data rates.

56. The architecture of claim 44 wherein the access management layer provides enforcing access restriction at the serving network.

57. The architecture of claim 44 wherein the core network provides routing functions.

58. The architecture of claim 44 wherein the core network provides connection types.

59. The architecture of claim 44 wherein the core network provides handling of multi-media sessions and accounting.

60. The architecture of claim 44 further including support for multiple xANs where each xAN is associated with a different technology.

61. The architecture of claim 44 wherein the access management layer forwards data sent by the first user.

62. The architecture of claim 44 wherein the core network provides mobility management for user mobility across a plurality of access networks.

63. The architecture of claim 44 wherein the access management layer provides usage collection functions.

64. The architecture of claim 44 wherein the core network provides accounting, authentication and authorization functions.

65. The architecture of claim 44 wherein the core network routes data to the first user via an IP address that the first user is currently using.

66. The architecture of claim 44 wherein the core network supports access to multiple network service layers from the same device.

67. The architecture of claim 44 wherein the network service management layer is the home network and "owns" the first user's subscription and associated profile.

68. The architecture of claim 44 wherein the network service management layer supports a "Unified Directory" for subscriber profiles and policies independent of the access type.

69. The architecture of claim 44 wherein the network service management layer provides mobility to subscribers on a large scale.

70. The architecture of claim 44 wherein the network service management layer allows the first user to roam in any local service layer.

71. The architecture of claim 44 wherein the network service management layer provides routing information to anyone requesting to establish communications with the first user.

72. The architecture of claim 44 wherein the network service management layer provides accounting, authentication and authorization functions for the first users.

* * * * *